United States Patent [19]

Sugiura

[11] Patent Number: 5,146,600
[45] Date of Patent: Sep. 8, 1992

[54] DOCUMENT IMAGE FILING SYSTEM FOR FURNISHING ADDITIONAL MANAGERIAL INFORMATION FOR MANAGEMENT OF DOCUMENTS FILED IN THE SYSTEM

[75] Inventor: Masamichi Sugiura, Osaka, Japan

[73] Assignee: Minolta Camera Kabushiki Kaisha, Osaka, Japan

[21] Appl. No.: 345,794

[22] Filed: May 1, 1989

[30] Foreign Application Priority Data

| Apr. 30, 1988 | [JP] | Japan | 63-108783 |
| Apr. 30, 1988 | [JP] | Japan | 63-108784 |
| Apr. 30, 1988 | [JP] | Japan | 63-108785 |

[51] Int. Cl.$^5$ ............................................. G06F 7/00
[52] U.S. Cl. ............................ 395/800; 364/DIG. 1; 364/243; 364/237.2; 364/259; 364/259.2; 364/260
[58] Field of Search ........................ 395/800; 364/200 MS File, 900 MS File

[56] References Cited

U.S. PATENT DOCUMENTS

| Re. 33,316 | 8/1990 | Katsuta et al. | 364/521 |
| 4,553,206 | 11/1985 | Smutek et al. | 364/300 |
| 4,573,084 | 2/1986 | Iida | 358/300 |
| 4,695,975 | 9/1987 | Bedrig | 364/900 |
| 4,817,050 | 3/1989 | Komatsu et al. | 364/900 |
| 4,852,045 | 7/1989 | Kraul et al. | 364/900 |
| 4,885,699 | 12/1989 | Taoda et al. | 364/518 |
| 4,918,646 | 4/1990 | Hirose | 364/900 |
| 4,943,868 | 7/1990 | Yoshinaga et al. | 358/403 |

FOREIGN PATENT DOCUMENTS 61-224558 1/1985 Japan .
60-3790 10/1986 Japan .

Primary Examiner—Thomas C. Lee
Assistant Examiner—Mehmet Geckil
Attorney, Agent, or Firm—Willian Brinks Olds Hofer Gilson & Lione

[57] ABSTRACT

An image filing system in which additional document identification data is used in addition to main document identification data for the identification of an image-bearing document and is formulated typically on the basis of a predetermined relationship detected between the number of times which a given document has been searched for and the number of times which the document has been used for printing purposes so that the main document identification data assigned to the document and used for the searching of the document is deemed inappropriate depending on the resultant count numbers for displaying and printing whereupon a message to that effect is issued to prompt the operator of the system to change the keyword. There may be used another form of additional managerial information which relates to the period of time for which a given document is to be saved so that, when a given document is found to have been saved for a period of time longer than the period of time preliminarily registered, a message to that effect is displayed to prompt the operator to delete the control data for the particular document.

16 Claims, 22 Drawing Sheets

| KEYWORD RESERVATION | |
|---|---|
| DATA TO BE SAVED FOR 2 YRS & 0 MTHS | |
| KEYWORD '1' | |
| KEYWORD '2' | |
| KEYWORD '3' | |
| KEYWORD '4' | |
| KEYWORD '5' | |
| END | |

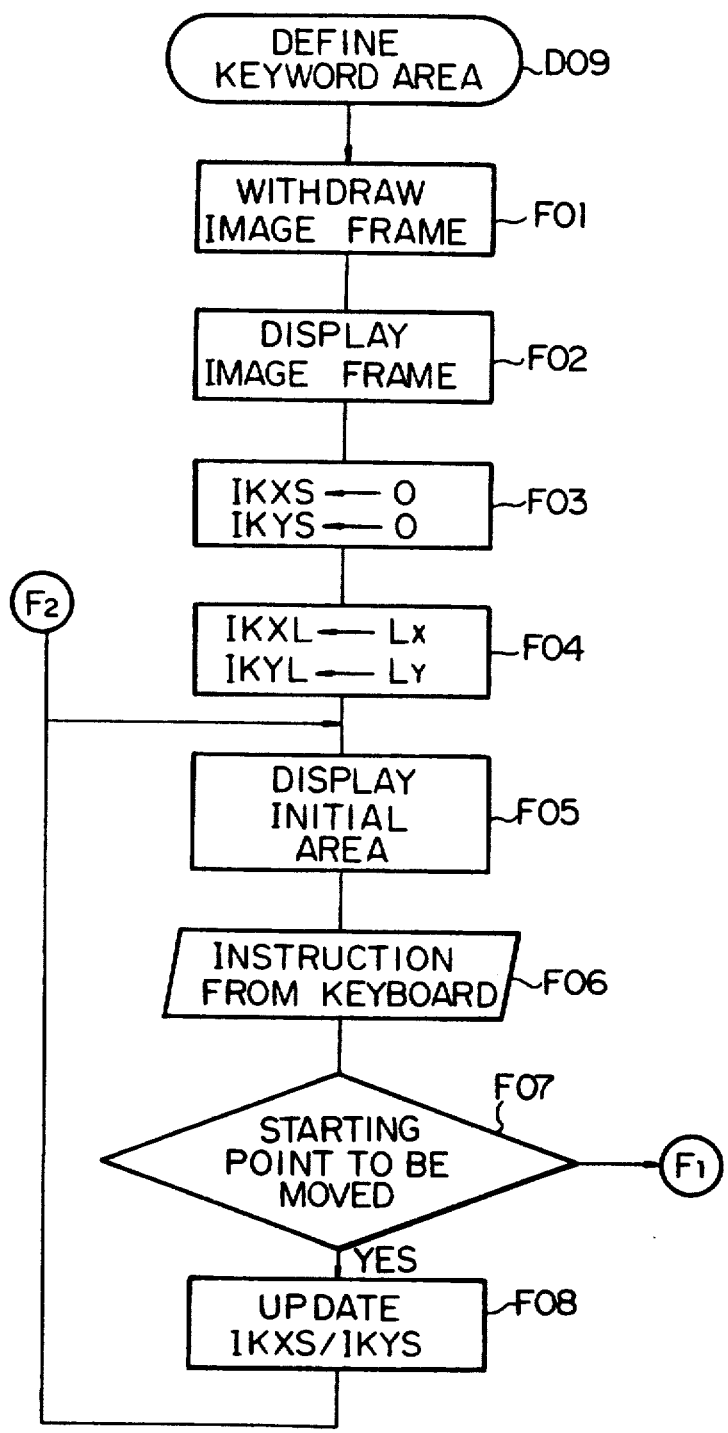

FIG. 22

| KEYWORD '1' | . . . . |
|---|---|
| KEYWORD '2' | . . . . |
| KEYWORD '3' | . . . . |
| KEYWORD '4' | . . . . |
| KEYWORD '5' | . . . . |

DISPLAYED: XX TIMES

PRINTED: XX TIMES

KEYWORD INAPPROPRIATE

SAVING PERIOD IS OVER

| DELETE | CHANGE | ANOTHER DOCUMENT | END |
|---|---|---|---|

DOCUMENT IMAGE FILING SYSTEM FOR FURNISHING ADDITIONAL MANAGERIAL INFORMATION FOR MANAGEMENT OF DOCUMENTS FILED IN THE SYSTEM

FIELD OF THE INVENTION

The present invention relates in general to image filing systems and, particularly, to an image filing system capable of reading an image on a document, preserving data relating to the image read from the document and reading out the preserved data for use thereafter. More particularly, the present invention relates to a method of managing the documents filed in an image filing system of the described nature.

BACKGROUND OF THE INVENTION

In order to preserve a number of documents with use of an image filing system and to make use of such documents effectively and efficiently, it is of importance that the system be used with an established scheme preliminarily formulated for the management of the documents to be stored into any memory medium under the control of the system. The fact is however that most of the users of such a system make managerial arrangements after a considerable amount of documents has been filed since the first use of the system. It may be herein noted that the "filing" of an image-bearing document involves a procedure to store into a memory medium not only the image data representative of the image read from the document but also the control data and keyword information associated with the image data.

Where documents are filed into an image filing system with no managerial scheme preliminarily established before the system is first put to use, it will be beneficial for the users of the system if there are available any additional managerial information exclusively identifying each of the documents filed.

SUMMARY OF THE INVENTION

It is accordingly an important object of the present invention to provide an improved image filing system capable of furnishing additional managerial information helpful for the management of the documents filed in the system.

It is another important object of the present invention to provide an improved image filing system capable of generating such additional managerial information on the basis of a certain relationship detected between the number of times which a given document has been searched for and the number of times which the document has been used for printing purposes.

It is still another important object of the present invention to provide an improved image filing system in which the period of time for which any given document is to be saved can be registered either automatically or arbitrarily by the user of the system and in which, when the document is found to have been saved for a period of time longer than the period of time thus registered, the operator of the system is informed of the fact by, for example, a message indicating that the period of time determined for the saving of the document has already lapsed.

Yet, it is still another important object of the present invention to provide an improved image filing system in which, when a document is found to have been saved for a period of time longer than the registered period of time, any "main" managerial information in the form of, for example, a keyword which has been assigned to the document may be deleted at the operator's option.

These and other objects of the present invention will be accomplished by an image filing system in which additional document identification data is displayed in addition to main document identification data for the identification of an image-bearing document. Such additional managerial information is formulated typically on the basis of a predetermined relationship detected between the number of times which a given document has been searched for and the number of times which the document has been used for printing purposes. For example, the fact that the number of times which a given document has been searched for is significantly larger than the number of times which the document has been used for printing purposes will indicate that the keyword or any other form of main managerial information assigned to the particular document for use in retrieving the document is inappropriate or unreasonable. If, thus, it is detected that the number of times which a given document has been searched for is larger than two times the number of times which the document has been used for printing purposes, it is deemed that the keyword assigned to the document and used for the searching of the document is inappropriate and should be substituted by a more reasonable keyword. When such a decision is made by the system, a message to that effect is issued to prompt the operator of the system to change the keyword.

Another form of additional managerial information used in an image filing system according to the present invention is the information relating to the period of time for which a given document is to be saved. Such a period of time is registered either optionally by the operator of the system or in an automatic fashion by means of the system per se in the absence of the operator's instruction. When the document is found to have been saved for a period of time longer than the period of time thus registered, the operator of the system is informed of the fact by, for example, a message is displayed to indicate that the period of time determined for the saving of the document has already lapsed. Responsive to such a message, the operator may delete the control data for the particular document to make inaccessible the image data which has been associated with the control data. The document having the control data could not be accessed during searching of documents with use of any keyword. This will contribute to significant reduction in the amount of time required for the searching of documents and will make it possible to make more efficient use of the data storage area of the memory medium.

BRIEF DESCRIPTION OF THE DRAWINGS

The features and advantages of an image filing system according to the present invention will be more clearly appreciated from the following description taken in conjunction with the accompanying drawings in which:

FIGS. 12A and 12B are flowcharts showing details of an image keyword area defining subroutine program included in the keyword input control subroutine program illustrated in FIGS. 8A and 8B;

FIG. 22 is a plan view showing a menu of selectable items which are to be displayed on the display unit of the system at the start of the file renewal subroutine program illustrated in FIGS. 21A and 21B.

DESCRIPTION OF THE PREFERRED EMBODIMENT

Description will be hereinafter made with reference to the drawings in regard to a preferred embodiment of an image filing system according to the present invention.

Figure 1:
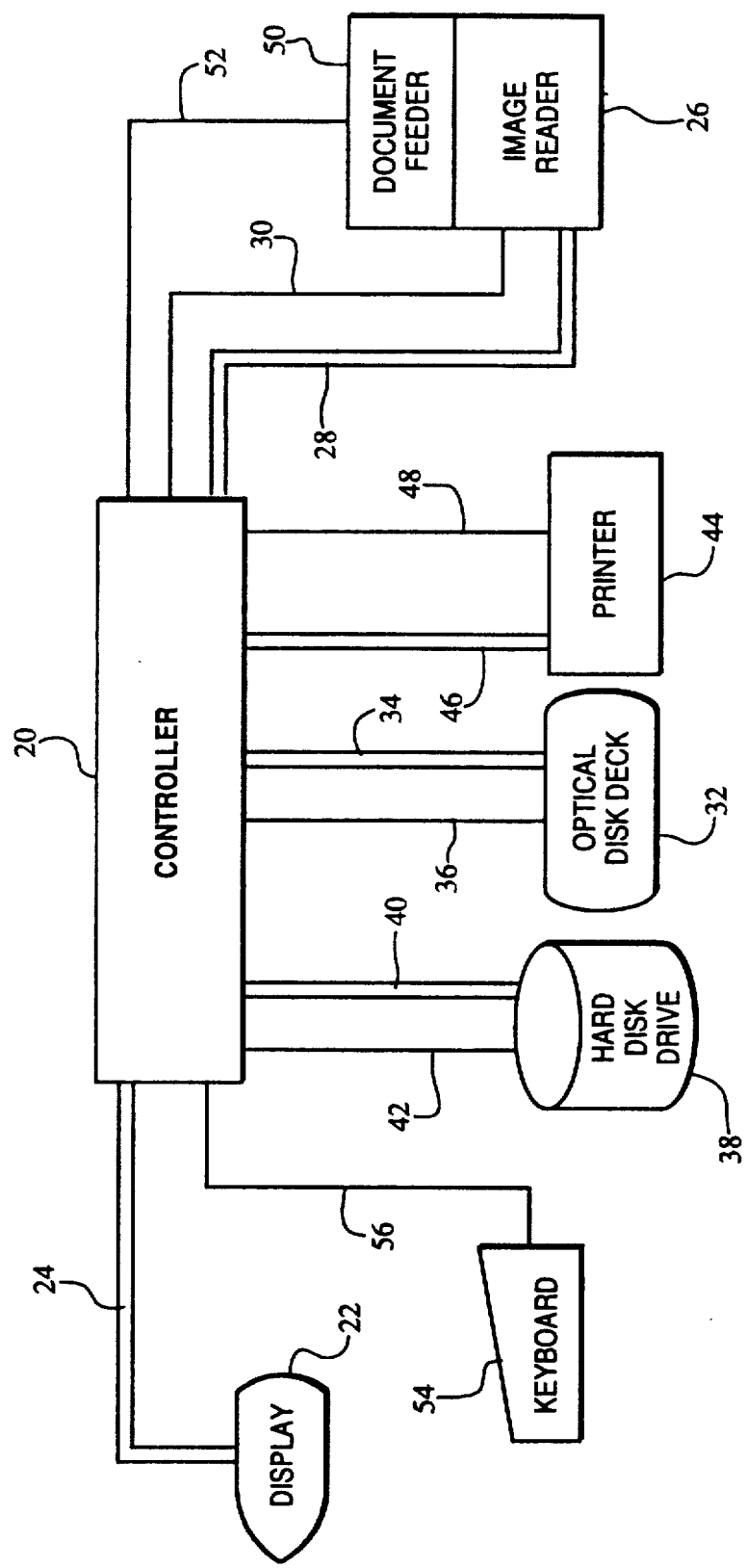
FIG. 1 is a diagram showing a representative example of the hardware architecture of an image filing system to which the present invention generally appertains.

Referring first to FIG. 1, an image filing system to which the present invention generally appertains includes a controller 20 connected to a display unit 22 through an image data bus 24. The display unit 22 is typically of the cathode ray tube (CRT) type. The controller 20 is further connected to an image reader 26 through an image data bus 28 and a command bus 30, an optical disk deck 32 through an image data bus 34 and a command bus 36, a hard disk drive unit 38 through an image data bus 40 and a command bus 42, end a printer 44 through an image data bus 46 and a command bus 48. Further connected to the controller 20 are an automatic document feeder 50 through a command bus 52 and a keyboard 54 through a command bus 56 as shown. The automatic document feeder 50 is provided in association with the image reader 26 and is used to feed a document to be optically scanned by the image reader 26 to generate image data representing the image borne on the document fed by the automatic document feeder 50.

Figure 2:
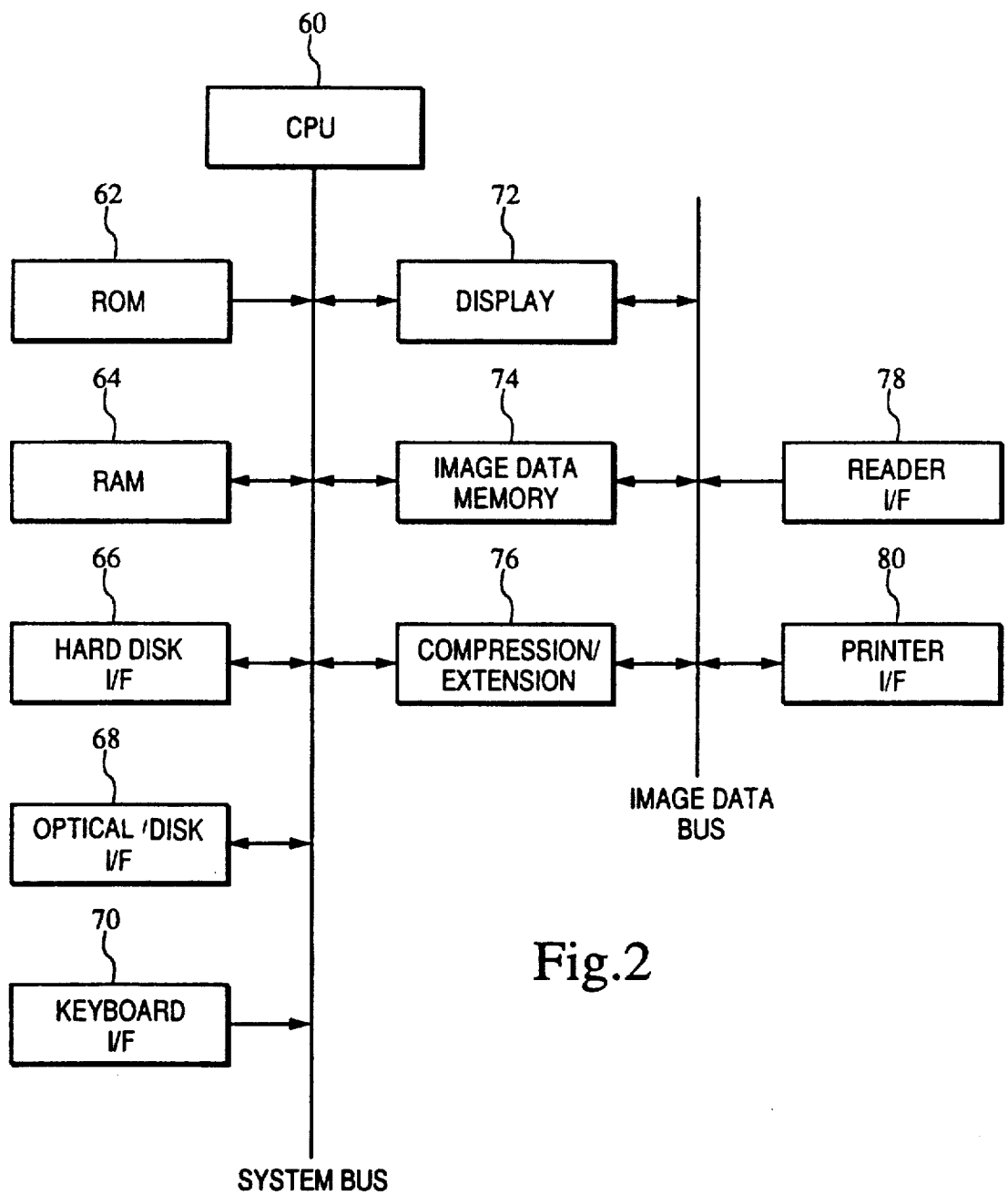
FIG. 2 is a block diagram schematically showing the general internal block configuration of the controller incorporated in the image filing system illustrated in FIG. 1.

In FIG. 2 is schematically shown the general internal block configuration of the controller 20 which forms part of such an image filing system. As shown, the controller 20 comprises a central processing unit 60 connected through a system bus to a read-only memory 62 (ROM), a random-access memory 64 (RAM), a hard disk interface circuit 66 (HD I/F), an optical disk interface circuit 68 (OD I/F), and a keyboard interface circuit 70 (KB I/F). The central processing unit 60 is further connected through the system bus to a display block 72, an image data memory block 74, and a data compression/extension block 76. These display block 72, image data memory block 74, and data compression/extension block 76 are further connected to an image reader interface circuit 78 and a printer interface circuit 80 through an image data bus.

The central processing unit 60 is predominant over all the phases and aspects of the operation to be performed in the system as a whole under the control of the programs stored in the read-only memory 62. Such phases and aspects of the operation to be governed by the central processing unit 60 include the operation to extract a particular characterizing image area of an image-bearing document and the operation to recognize alphanumerical features on the document.

The hard disk interface circuit 66 is used to transfer to a designated destination the control data relating to the image data stored or to be stored in a hard disk (not shown) and the data representing a main keyword which may be entered through the keyboard 54 by the operator of the system. The optical disk interface circuit 68 transmits to an optical disk (not shown) the image data coded by the data compression/extension block 76 during storage of image data. For displaying of the image stored, the optical disk interface circuit 68 transmits to the data compression/extension block 76 the coded image data supplied from the optical disk. The keyboard interface circuit 70 is used to transmit to the central processing unit 60 various pieces of data supplied from the keyboard 54.

The display block 72 is operative to display on the CRT display unit 22 the image represented by the image data received from image data memory block 74 through the data compression/extension block 76. The display block 72 has a display data storage memory incorporated therein and is further operative to store the image data stored into the display data storage memory directly from the central processing unit 60 per se. On the other hand, the image data memory block 74 has a data storage capacity for storing at least a page of data and is adapted to store the image data supplied through the image reader interface circuit 78. The image data thus stored in the image data memory block 74 is transferred either to the printer interface circuit 80 or to the data compression/extension block 76. The image data memory block 74 is further used to store the data extended by the data compression/extension block 76 and transferred to the memory block 74 and the image data representative of the image in the characterizing image area scanned by the image reader 26.

Data is stored into or fetched from the image data memory block 74 directly under the control of the central processing unit 60 and image data is exchanged between the hard disk interface circuit 66, optical disk interface circuit 68 and data compression/extension block 76. It may be noted that the image data memory block 74 can be accessed either through the system bus or by way of the image data bus as will be seen from FIG. 2.

The data compression/extension block 76 is composed of a data compression section adapted to code image data and a data extension section adapted to decode coded image data into data of original form The image data transmitted from the image data memory block 74 and supplied through the image data bus to the data compression/extension block 76 is transferred to the optical disk interface circuit 68 after the data received is coded by the data compression section of the block 76. Furthermore, the coded image data received from the optical disk interface circuit 68 through the system bus is transferred through the image data bus to the image data memory block 74 after the data received is decoded by the data extension section of the block 76.

The image reader interface circuit 78 is operative to transfer to the image data memory block 74 the data representing an image scanned by the image reader 26. Furthermore, the printer interface circuit 80 is operative to transfer to the printer 44 the image data fetched from the image data memory block 74 or the display data storage memory of the display block 72 and controls the printer 44 to produce a printed output of the image information thus supplied to the printer 22.

Description will be hereinafter made regarding the various modes of operation of the image filing system embodying the present invention.

Figure 3:
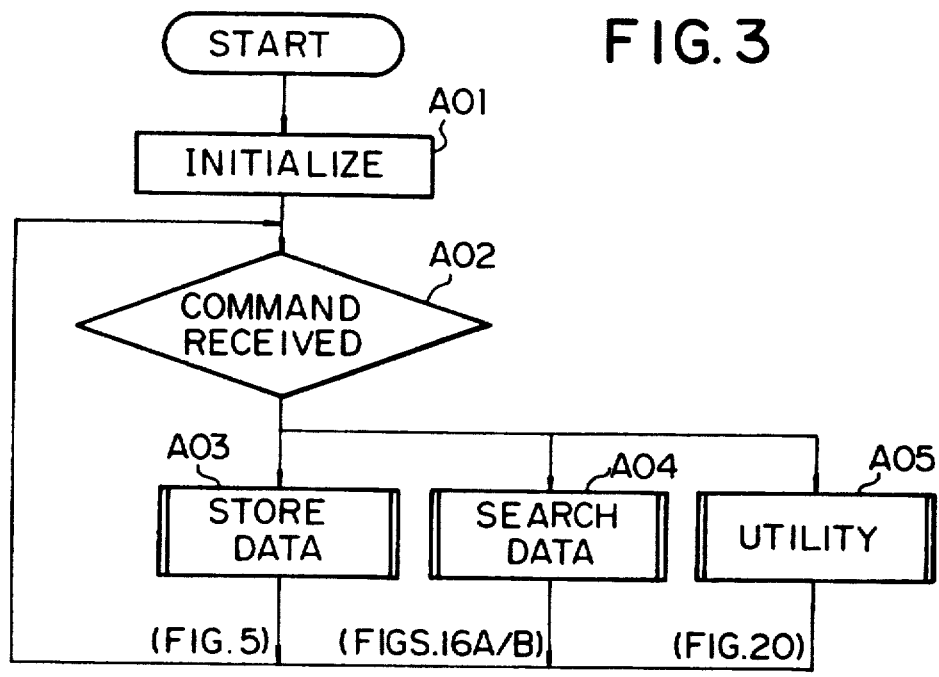
FIG. 3 is a flowchart showing a main routine program to be executed by the central processing unit which forms part of the controller illustrated in FIG. 2.
Figure 4:
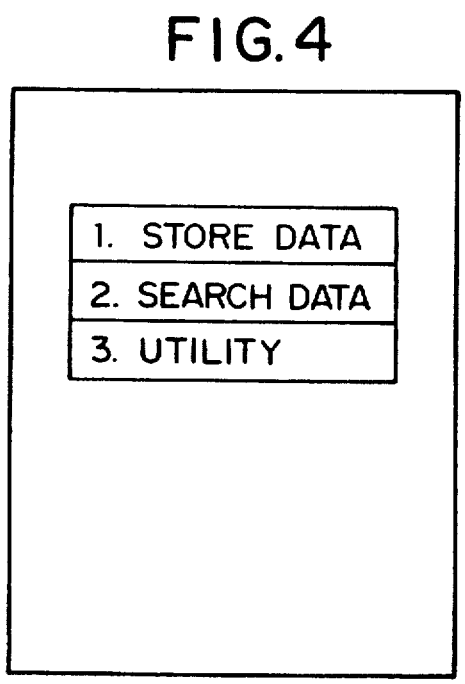
FIG. 4 is a plan view showing a menu of selectable items which are to be displayed on the screen of the display unit of the system at the start of the main routine program illustrated in FIG. 4.

FIG. 3 shows a main routine program to be executed by the central processing unit 60 which forms part of the controller 20 hereinbefore described with reference to FIGS. 1 and 2. Further shown in FIG. 4 is a menu of selectable items which are to be displayed on the screen of the CRT display unit 22 of the system at the start of the main routine program.

When the image filing system is initially switched in and energized, the central processing unit 60 executes step A01 to initialize various operating conditions and parameters of the system in accordance with preset default rules. When the initialization of such operating conditions and parameters of the system is complete, the central processing unit 60 proceeds to step A02 to check if there is a command input from the keyboard 54 demanding the central processing unit 60 to store new image data, search for any data stored, or execute any utility program.

Depending on the nature of the command which may thus be supplied from the keyboard 22, the central processing unit 60 then proceeds to a data storage subroutine program A03, a data search subroutine program A04, or a utility subroutine program A05 as shown. When there is a command demanding the execution of any of these subroutine programs, the name of the particular subroutine program is shown highlighted on the display screen as shown in FIG. 4. Details of the data storage subroutine program A03, data search subroutine program A04, and utility subroutine program A05 will be hereinafter described with reference to FIGS. 5, FIGS. 16A and 16B, and FIG. 20, respectively.

Figure 5:
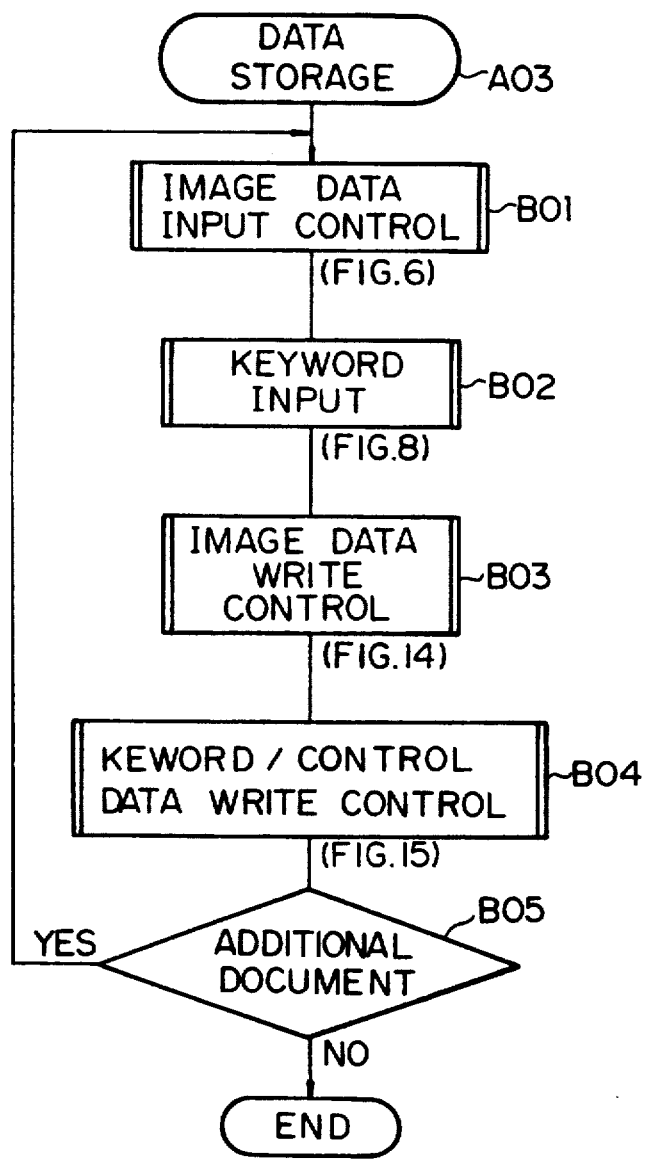
FIG. 5 is a flowchart showing the details of a data storage subroutine program included in the main routine program illustrated in FIG. 3.

FIG. 5 shows the details of the data storage subroutine program A03 included in the main routine program hereinbefore described with reference to FIG. 3.

The data storage subroutine program A03 starts with an image data input control subroutine program B01 through which the image on the document currently in use is read and, thereupon, various parameters are selected for the display of the image on the screen of the CRT display unit 22. Details of this image data input control subroutine program B01 will be hereinafter described with reference to FIG. 6. The central processing unit 60 then proceeds to a keyword input control subroutine program B02 through which a keyword for retrieving a particular document stored in and to be fetched from the image data memory block 74 is to be assigned to the particular document. Details of this keyword input control subroutine program B02 will be hereinafter described with reference to FIGS. 8A and 8B.

The keyword input control subroutine program B02 is followed by an image data write control subroutine program B03 through which the image data generated by and supplied from the image reader 26 and stored in the image data memory 74 is to be coded by the data compression/extension block 76 and is then stored into the optical disk through the optical disk interface circuit 68. Details of this image data write control subroutine program B03 will be hereinafter described with reference to FIG. 14.

Subsequently to the image data write control subroutine program B03, the central processing unit 60 may proceed to a keyword/control data write control subroutine program B04 through which a keyword entered through the keyboard 22 for the retrieval of a particular document and the control data predominant over the document are to be written into the hard disk through the hard disk interface circuit 66. The control data associated with a document may include data designating the location at which the image data is to be stored in the optical disk and the share which the image data is to take in the capacity of the disk. Details of this keyword-/control data write control subroutine program B04 will be hereinafter described with reference to FIG. 15.

The subroutine program B04 may be followed by decision step B05 at which the question whether or not there is any additional document which the operator of the system desires to have read by the image reader 26 is answered. If it is found at this step B05 that there is such a document, the central processing unit 60 reverts to the initial subroutine program B01 and may recycle the subroutine programs B01 to B04 until the answer for the step B05 is given in the negative. When the answer for the step B05 is thus given in the negative, the central processing unit 60 terminates execution of the data storage subroutine program A03 and may revert to the main routine program hereinbefore described with reference to FIG. 4.

Figure 6:
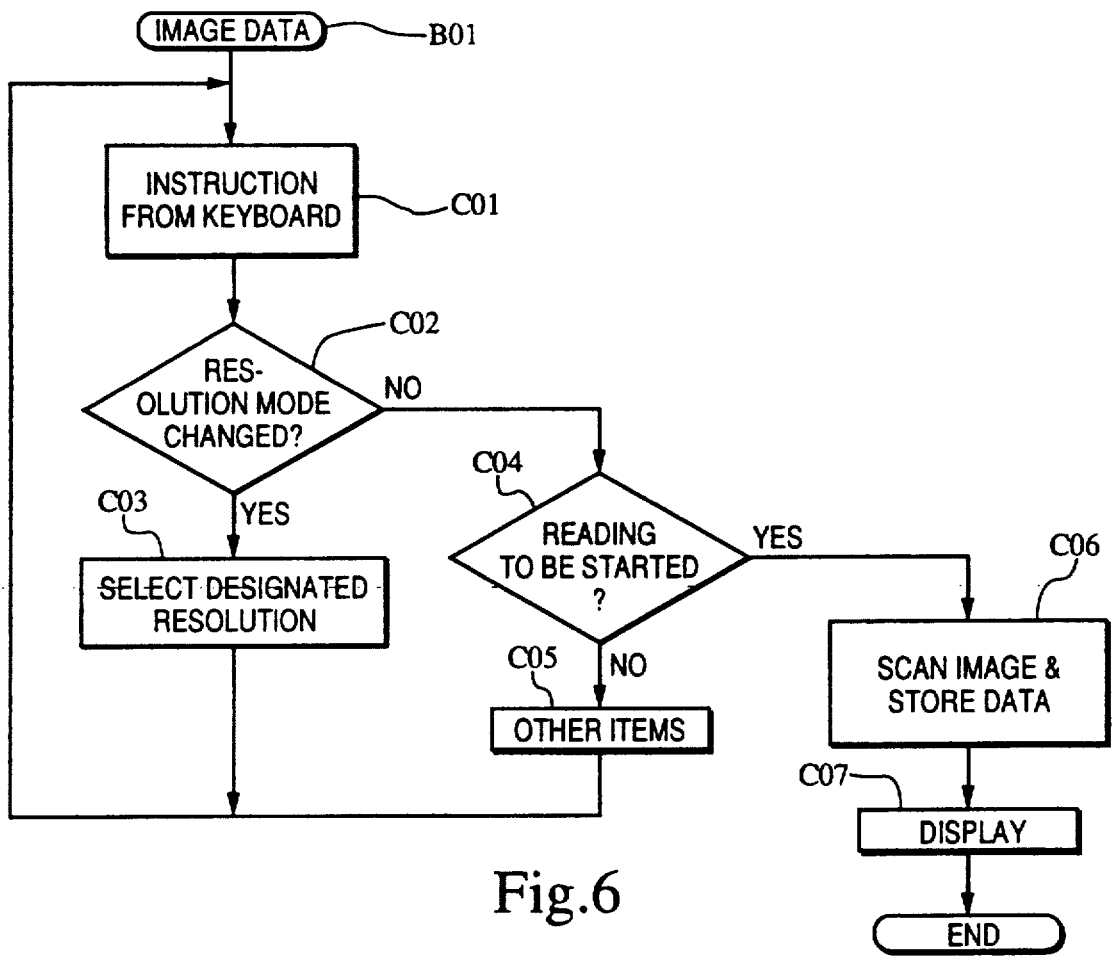
FIG. 6 is a flowchart showing the details of an image data input control subroutine program included in the image data storage routine program illustrated in FIG. 5.
Figure 7:
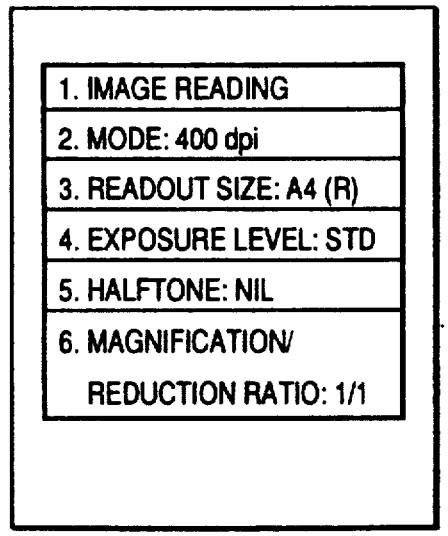
FIG. 7 is a plan view showing a menu of selectable items which are to be on display during execution of the image data input control subroutine program illustrated in FIG. 6.

FIG. 6 shows the details of the image data input control subroutine program B01 included in the image data storage routine program A03 hereinbefore described with reference to FIG. 5. This image data input control subroutine program B01 is to be executed responsive to any instruction entered through the keyboard 54 by the operator referencing the selectable items of the menu displayed on the screen of the CRT display unit 22. As illustrated in FIG. 7, the menu is herein assumed to include the following items:

| (1) Image Reading | |
|---|---|
| (2) Resolution Mode: | 400 dpi |
| (3) Readout Size: | A4 (R) |
| (4) Exposure Level: | Standard |
| (5) Magnification/Reduction Ratio: | 1/1 |

Thus, the image data input control subroutine program B01 starts with step C01 at which the central processing unit 60 is responsive to an operator's instruction which may be entered through the keyboard 54 in respect of each of the items on display. At this stage of operation, it is assumed that the document bearing the image information to be stored into the image filing system is either loaded into the automatic document feeder 50 associated with the image reader 26 or placed on the document table of the image reader 26 per se. The document loaded into the automatic document feeder 50 is conveyed onto the document table of the image reader 26 in response to an operator's instruction demanding the start of the image reading operation.

After the instruction received from the keyboard 54 is thus responded to as at step C01, it is checked at step C02 to see if the image resolution mode has been changed by the operator. It may thus be detected at this step C02 that the resolution mode previously selected has been changed to, for example, the high-density resolution mode selecting the printing density of 400 dpi (dots per inch) or to the standard-density resolution mode selecting the printing density of 200 dpi. If it is found at step C02 that this is the case, such a change in the image resolution mode is effected at step C03, whereupon the central processing unit 60 reverts to step C01 to check for another instruction which may be supplied from the keyboard 54. When there is another instruction supplied from the keyboard 54, the central processing unit 60 proceeds to step C02 for a second time to see if there is another change made in respect of the image resolution mode to be used.

If it is now found at step C02 that there is no change made in respect of the image resolution mode, the step C02 is followed by step C04 to detect whether or not there is an operator's instruction demanding the image reader 26 to start reading of the document placed on the document table of the image reader 26. If the answer for this step C04 is given in the negative, the central processing unit 60 proceeds to step C05 to prepare for the establishment of conditions conforming to the parameters selected for the individual items on display.

Thereupon, the central processing unit 60 for a second time reverts to step C01 to check for another instruction which may be supplied from the keyboard 54. When there is another instruction supplied from the keyboard 54, the central processing unit 60 proceeds to step C02 and possibly from the step C02 to step C04 to check if there is an operator's instruction demanding the image reader 26 to start reading of the document. If there is such an operator's instruction present and accordingly the answer for this step C04 is given in the affirmative, then the central processing unit 60 proceeds to step C06 to activate the image reader 26 to scan the document on the document table. A beam of light bearing the image information picked up from the document on the table is now directed to an optoelectrical transducer which forms part of the image reader 26, which thus digitize the image information to produce digital signals representing the image read from the document. These signals are supplied as image data through the image reader interface circuit 78 to the image data memory block 74 of the controller 20 of the image filing system. As well known in the art, the image on the document is in this instance scanned in horizontal or primary direction electrically by the optoelectric transducer and in vertical or secondary direction by the reciprocating movement of the image scanner.

The image data thus stored into the image data memory block 74 of the controller 20 is supplied through the data compression/extension block 76 to the display data storage memory incorporated in the display block 72. A frame or page of image represented by the image data thus received from image data memory block 74 is at step C07 displayed on the CRT display unit 22 with the dots forming each unit image area decimated, if necessary, in a ratio corresponding to the selected magnification/reduction ratio. The purpose of thus decimating the dots forming each unit image area is to make it possible to display the whole image area of the document on the CRT display unit 22 despite the difference between the resolutions available of the image reader 26 and the display unit 22. After execution of the step C07, the central processing unit 60 terminates the execution of the image data input control subroutine program B01 and may revert to the image data storage subroutine program A03 hereinbefore described with reference to FIG. 5.

Figure 8A:
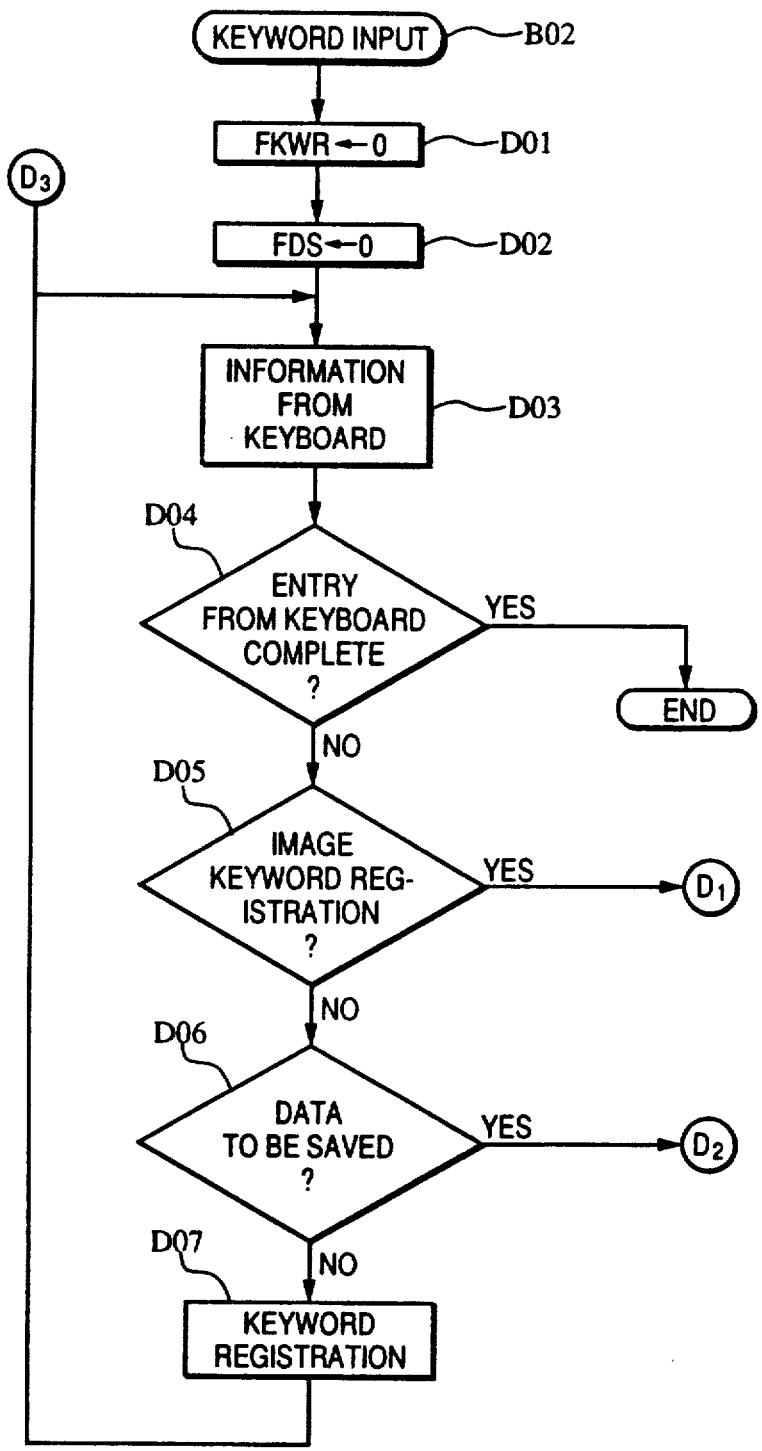
FIGS. 8A and 8B are flowcharts showing the details of a keyword input control subroutine program also included in the image data storage routine program illustrated in FIG. 5.
Figure 8B:
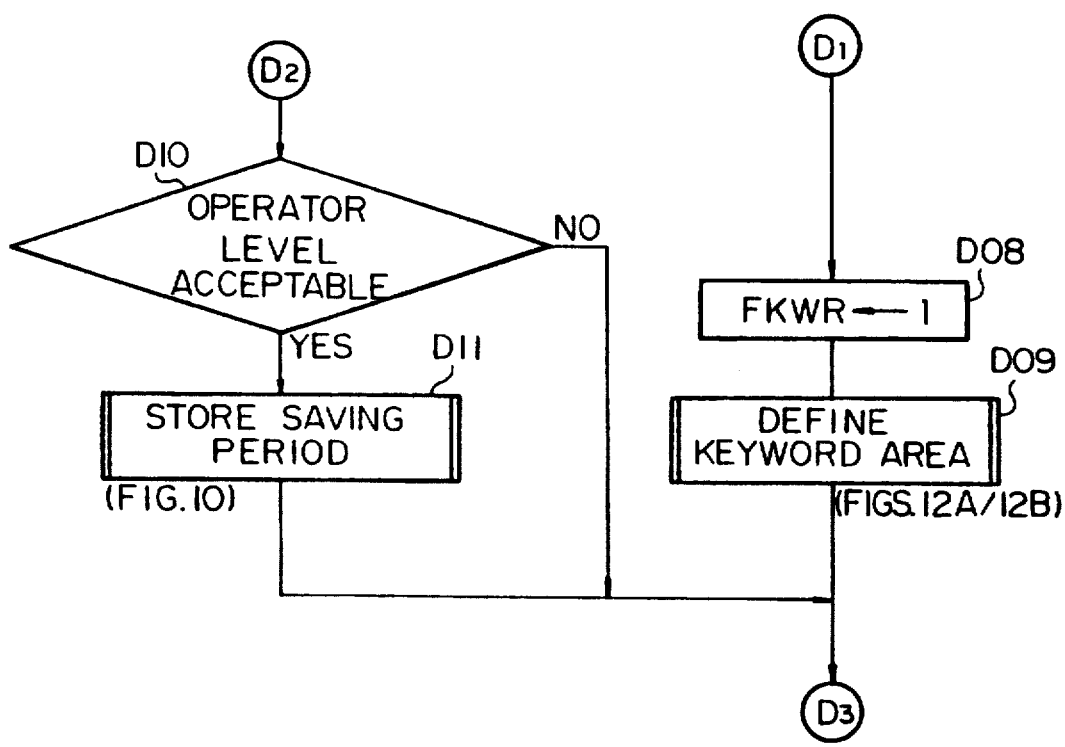
Figure 9:
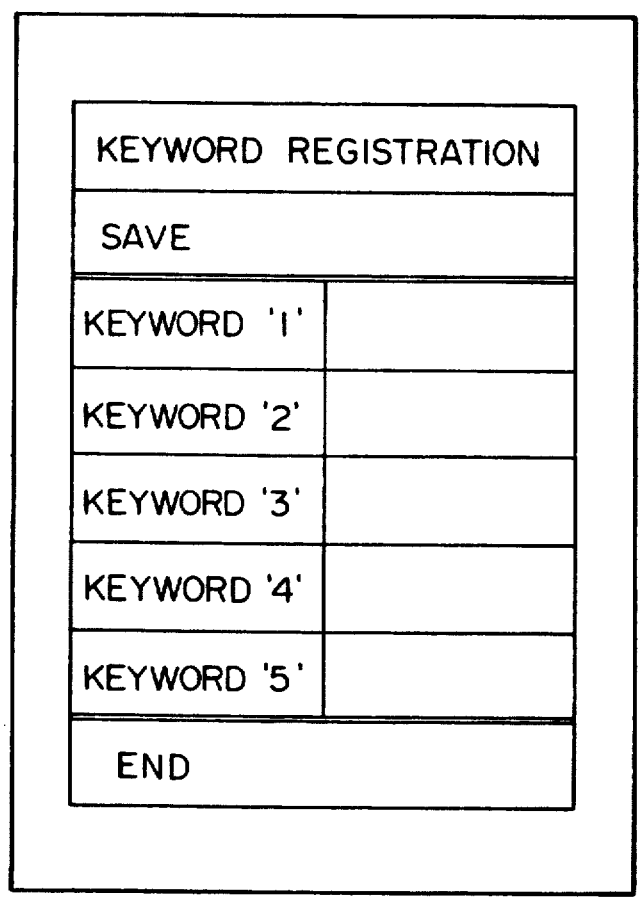
FIG. 9 is a plan view showing a menu of selectable items which are to be on display at the start of the keyword input control subroutine program illustrated in FIGS. 8A and 8B.

FIGS. 8A and 8B show the details of the keyword input control subroutine program B02 also included in the image data storage routine program A03 hereinbefore described with reference to FIG. 5. Further shown in FIG. 9 is a menu of selectable items which are to be displayed on the screen of the CRT display unit 22 at the start of the keyword input control subroutine program B02.

The keyword input control subroutine program B02 herein shown starts with step D01 at which an additional keyword registration flag "FKWR" is reset to logic "0" state. This additional keyword registration flag "FKWR" is indicative of whether or not an additional keyword indicating a "characterizing" image area of a document which represents the prominent feature of the document is to be registered. Such an additional keyword is stored independently of the image information picked up from a document and is used as ancillary document retrieval information in addition to the "main" keyword information in the form of a sequence of alphanumerical letters. This type of ancillary document retrieval information assigned to a particular document will be hereinafter referred to as additional or image keyword. The additional keyword registration flag "FKWR" reset to logic "0" state at step D01 thus indicates that the image keyword associated with the document currently in use is not to be registered. The image keyword herein used may be in the form of a drawing, a graph, a table or a portion of such a graphic feature or any alphanumrical or symbolic feature.

Subsequently to step D01, the central processing unit 60 proceeds to step D02 to reset an image data save flag "FDS" to logic "0" state. This image data save flag "FDS" is indicative of whether or not the period of time for which the image data generated from the document currently in use is to be saved should be designated in respect of the particular image data. Thus, the image data save flag "FDS" reset to logic "0" state at step D02 indicates that the period of time for which the image data generated from the document currently in use is to be saved need not to be designated.

The step D02 is followed by step D03 at which the central processing unit 60 is responsive to an instruction which may be received from the keyboard 54. The operator of the system may key in a keyword or two or more keywords for the document currently in use while referencing the menu displayed on the screen of the CRT display unit 22 as illustrated in FIG. 9.

After a keyword or a plurality of keywords received from the keyboard 22 are thus responded to by the central processing unit 60 as at step D03, it is checked at step D04 to see if entry of any information through the keyboard 54 is complete for the document currently in use. The information which may be entered through the keyboard 54 as queried at this step D04 may be, for example, the image keywords "1" to "5" as shown in FIG. 9. If it is found at step D04 that this is the case, the central processing unit 60 terminates the execution of this keyword input control subroutine program B02 and may revert to the image data storage subroutine program A03 hereinbefore described with reference to FIG. 5.

If it is found at step D04 that entry of information through the keyboard 54 is still in progress and accordingly the answer for the step D04 is given in the negative, it is checked at step D05 if the instruction received from the keyboard 54 as at step D03 is a request for registering an image keyword. If the answer for this step D05 is given in the negative, the central processing unit 60 proceeds to step D06 to check if there is any period of time designated for the saving of the image data to be read from the document currently in use. This decision is made on the basis of the image data save flag "FDS" which is to be set to logic "1" state when such a period of time is designated through the keyboard 54.

If it is found at step D06 that there is no period of time designated for the saving of the image data, the central processing unit 60 proceeds to step D07 to execute an ordinary procedure necessary for the registration of the keyword or keywords entered. On termination of such a procedure at step D07, the central processing unit 60 reverts to step D03 and may thus repeat the steps D03 to D07 if the answer for each of the steps D04 to D06 is given in the negative.

If it is found at step D05 that the instruction received from the keyboard 54 as at step D03 is a request for registering an image keyword, the central processing unit 60 proceeds to step D08 to set the image keyword registration flag "FKWR" to logic "1" state. Subsequently to step D07, the central processing unit 60 executes an image keyword area defining subroutine program D09 to define an image keyword area specific to the document currently in use as the previously mentioned characterizing image area for the document. Details of this image keyword area defining subroutine program D09 will be hereinafter described with reference to FIGS. 12A and 12B.

On the other hand if it is found at step D06 that there is a period of time designated for the saving of the image data generated from the document currently in use, the central processing unit 60 then proceeds to step D10 to confirm whether or not the "operator level" is acceptable. The "operator level" herein referred to is indicative of the degree of the operator's capability and/or the degree of the operator's experiences or skills required for the registration and saving of image information in the system under consideration and may be predetermined for the status and office which each of the possible users of the system has in the organization to which the user belongs. The data representing such criteria for determining the operator level is contained in the operator's identification code entered into the system when the system is initially booted up.

If it is found at step D10 that the operator level is not acceptable, the central processing unit 60 reverts to step D03. On the other hand, if it is found at the step D10 that the operator level is acceptable and accordingly the answer for the step D10 is given in the affirmative, the central processing unit 60 executes a saving period data storage subroutine program D11 to store into the hard disk the data representing the designated period of time for the saving of the image data to be read from the document in use. Details of this saving period data storage subroutine program D11 will be hereinafter described with reference to FIG. 10. After execution of the saving period data storage subroutine program D11, the central processing unit 60 also reverts to step D03.

Figures 10, 11:
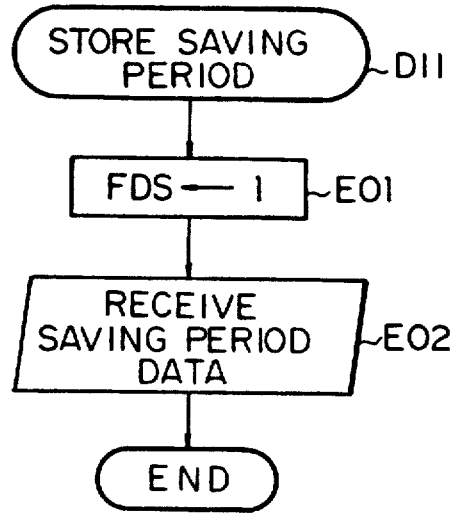
FIG. 10 is a flowchart showing details of an image data saving period data storage subroutine program included in the keyword input control subroutine program illustrated in FIGS. 8A and 8B.
FIG. 11 is a plan view showing a menu of selectable items which are to be on display at the start of the image data saving period data storage subroutine program illustrated in FIG. 10.

FIG. 10 shows the details of the image data saving period data storage subroutine program D11 included in the keyword input control subroutine program B02 hereinbefore described with reference to FIGS. 8A and 8B. Illustrated in FIG. 11 is a frame of image which may be displayed on the screen of the CRT display unit 22 after the period of time for which the image data to be read from the document currently in use is to be saved is designated during execution of the subroutine program D11.

The image data saving period data storage subroutine program D11 starts with step E01 to set the image data save flag "FDS" to logic "1" state. Subsequently to step E01, the central processing unit 60 proceeds to step E02 to respond to the data representing the image data saving period of time designated by the operator of the system. The central processing unit 60 having executed the step E02 terminates the execution of the image data saving period data storage subroutine program D11 and may revert to the keyword input control subroutine program B02 hereinbefore described with reference to FIGS. 8A and 8B.

Figure 12B:
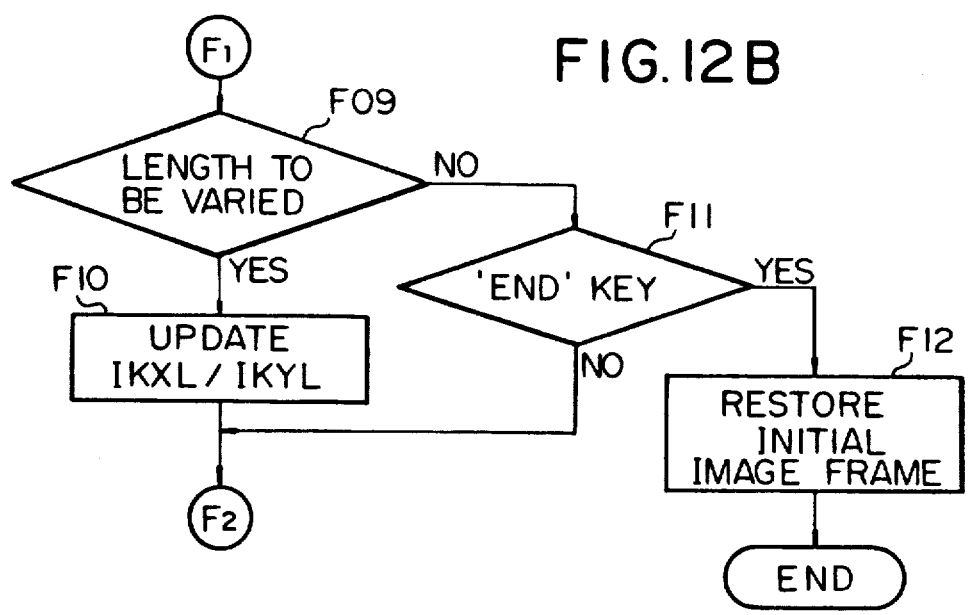
Figure 13:
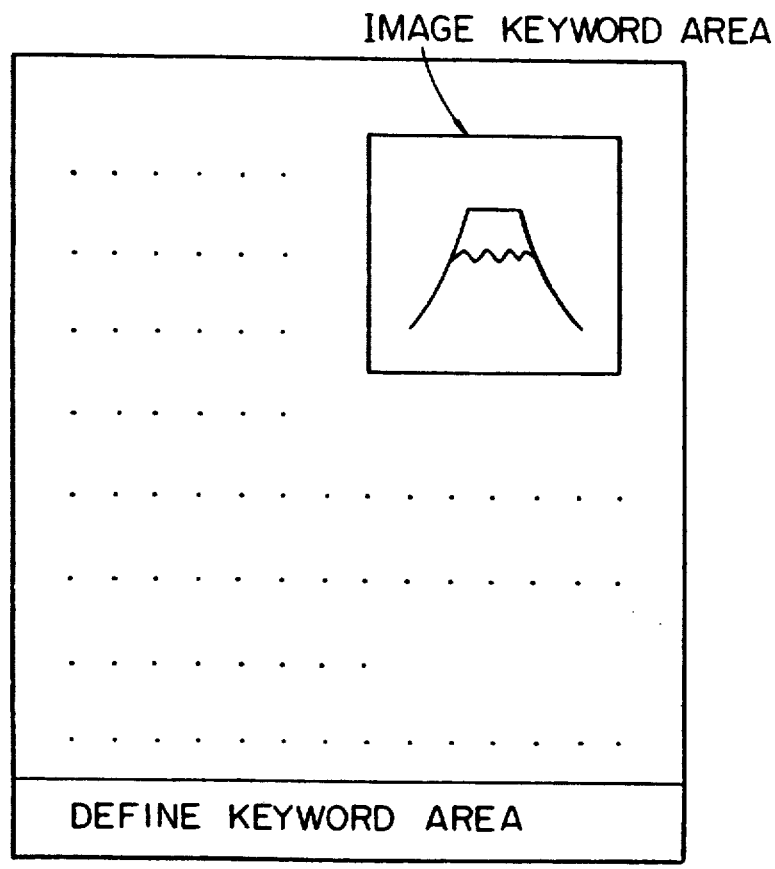
FIG. 13 is a plan view showing a frame of image which may be on display at the start of the image keyword area defining subroutine program illustrated in FIGS. 12A and 12B.

FIGS. 12A and 12B are flowcharts showing details of the image keyword area defining subroutine program D09 further included in the keyword input control subroutine program B02 hereinbefore described with reference to FIGS. 8A and 8B. Further shown in FIG. 13 is a frame of image which is to be displayed on the screen of the CRT display unit 22 to prompt the operator to enter data for defining the image keyword area designated.

The image keyword area defining subroutine program D09 starts with step F01 to withdraw from the screen of the CRT display unit 22 the image frame indicated in FIG. 11. The central processing unit 60 then proceeds to step F02 to display on the screen of the CRT display unit 22 a frame of image represented by the image data fetched from the display data storage memory of the display block 72 to which the image data read from the document in use has been transferred from the image data memory block 74. The step F02 is followed by step F03 at which the x-axis and y-axis coordinate values IKXS and IKYS indicative of the starting coordinate point of an image keyword area are set each at a predetermined initial value of, for example, "0". The step F03 in turn is followed by step F04 at which the measurements IKXL and IKYL indicative of the measurements from the starting coordinate point of the image keyword are set at predetermined initial values $L_X$ and $L_Y$, respectively.

With the numerical data representing the starting the coordinate values IKXS and IKYS and the measurements IKXL and IKYL thus initialized at steps F03 and F04, the central processing unit 60 proceeds to step F05 to display on the screen of the CRT display unit 22 a frame of image containing the image keyword area defined by these numerical data. Thereafter, the central processing unit 60 proceeds to step F06 and is responsive to an operator's instruction which may be entered through the keyboard 54 by the operator of the system. Thus, if it is detected at step F07 that an operator's instruction is entered to request movement of the starting point of the image keyword, the step F07 is followed by step F08 at which either the x-axis coordinate value IKXS or the y-axis coordinate value IKYS of the starting coordinate point of the image keyword area currently on display is updated, viz., either incremented or decremented and the image keyword area defined by the updated x-axis or y-axis coordinate value IKXS or IKYS is displayed on the screen of the CRT display unit 22.

If it is detected at step F09 that an operator's instruction is entered to increase or decrease the measurement of the image keyword area from the starting point in the x-axis or y-axis direction, the initial numerical value of either the measurement IKXL or the measurement IKYL of the image keyword area currently on display is either incremented or decremented and the image keyword area defined by the updated measurement IKXL or IKYL is displayed on the screen of the CRT display unit 22 as at step F10. Illustrated in FIG. 13 is an example of the frame of image which is thus finally defined through execution of the steps F07 and F08 and steps F09 and F10 and displayed on the screen of the CRT display unit 22.

The movement of the starting point of an image keyword area or the alteration of the x-axis and y-axis measurements may be effected through concurrent manipulation of a "move" request key or a "change length" request key and any of the cursor keys similar to those provided in an ordinary keyboard of, for example, a personal computer.

When it is then detected at step F11 that an operator's instruction is entered through the keyboard 54 to put an end to the image keyword area defining operation with, for example, an "end" key depressed on the keyboard 54, the central processing unit 60 proceeds to step F12 to restore the image frame of FIG. 11 on the screen of the CRT display unit 22. The central processing unit 60 then terminates the execution of the image keyword area defining subroutine program D09 and may revert to the keyword input control subroutine program B02 hereinbefore described with reference to FIGS. 8A and 8B. Subsequently to step F08 or step F10 or when it is found at step F11 that an operator's instruction to put an end to the image keyword area defining operation is not entered, the central processing unit 60 returns to step F05 and may repeat any of the loops formed by the steps F09 to F11 until it is finally determined at step F12 that the defining of the image keyword area is complete.

Figure 14:
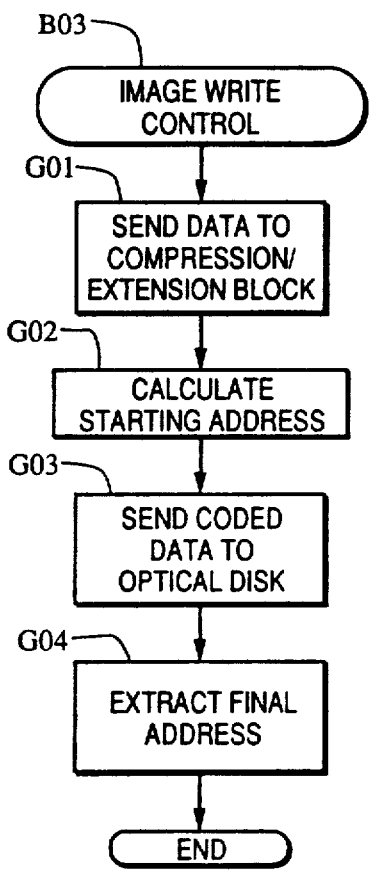
FIG. 14 is a flowchart showing the details of an image data write control subroutine program also included in the image data storage routine program illustrated in FIG. 5.

FIG. 14 shows the details of the image data write control subroutine program B03 also included in the image data storage routine program A03 hereinbefore described with reference to FIG. 5.

The image data write control subroutine program B03 starts with step G01 at which the image data which has been stored in the image data memory block 74 is transferred to the data compression/extension block 76 and is coded and compressed therein. Subsequently, the central processing unit 60 proceeds to step G02 to calculate the address at which the image data is to be stored into the optical disk. The starting address to be thus assigned to the image data to be registered is immediately subsequent to the address assigned to the image data which was last stored into the optical disk.

The step G02 is followed by step G03 at which the image data which has been coded and compressed by the pieces of data compression/extension block 76 is transferred to and stored into the optical disk through the optical disk interface circuit 68 successively in a sequence starting with the address calculated at step G02. The central processing unit 60 then proceeds to step G04 at which the final address assigned to the image data thus stored into the optical disk is extracted for storage as control data into the hard disk.

Figure 15:
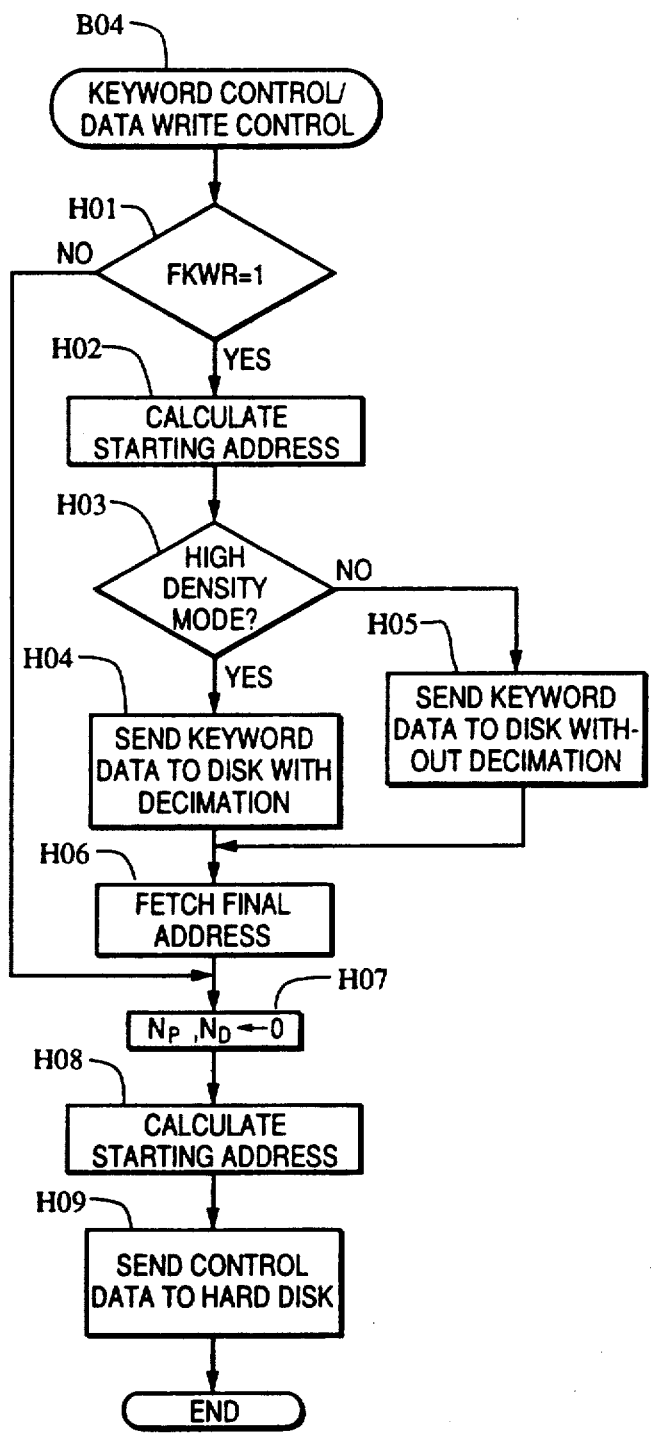
FIG. 15 is a flowchart showing the details of a keyword/control data write control subroutine program further included in the image data storage routine program illustrated in FIG. 5.

FIG. 15 shows the details of the keyword/control data write control subroutine program B04 further included in the image data storage routine program A03 hereinbefore described with reference to FIG. 5.

The keyword/control data write control subroutine program B04 starts with step H01 to check if the image keyword registration flag "FKWR" is set to logic "1" state. The image keyword registration flag "FKWR" of logic "1" state indicates that the period of time for which the image data generated from the document currently in use is to be saved should be designated. If the answer for this step H01 is given in the affirmative, the central processing unit 60 proceeds to step H02 to calculate the starting address at which the image data is to be stored into the optical disk. Subsequently, it is detected at step H03 whether or not the high-density resolution mode is currently selected providing the printing density of 400 dpi. The central processing unit 60 then proceeds to step H04 or step H05 to load into the optical disk the image data stored in the image data memory block 74 and contained in an image area corresponding to the area defined by the coordinate values IKXS and IKYS and measurements IKXL and IKYL at steps F08 and F10 of the image keyword area defining subroutine program D09 (FIGS. 12A and 12B). If, in this instance, it is found at step H03 that the high-density resolution mode is currently selected and accordingly the answer for the step H03 is given in the affirmative, the step H03 is followed by step H04 at which the image data is transferred to the optical disk through the optical disk interface circuit 68 with the dots forming each unit image area decimated in a ratio corresponding to the selected magnification/reduction ratio. On the other hand, if the answer for the step H03 is given in the negative, then the step H03 is followed by step H05 at which the image data is as it is transferred to the optical disk through the optical disk interface circuit 68. As has been noted, the purpose of thus decimating the dots forming each unit image area of the image to be stored into the optical disk is to display the whole image area of the document on the CRT display unit 22.

It may be further added that the image data contained in the image area corresponding to the area defined by the coordinate values IKXS and IKYS and measurements IKXL and IKYL as above described is stored as image keyword data into the optical disk in a memory area such as for example a page or a filing area different from the memory area into which the ordinary image data is to be stored. It may also be noted that the image keyword data is stored into the optical disk without being compressed in the data compression/extension block 76. This is because of the fact that the area in which the image keyword is to be displayed on the screen of the display unit ordinarily has a relatively small size requiring a relatively small share in the total data storage capacity available in the optical disk. The image keyword data being thus not compressed when the data is stored into the optical disk, the data need not be decoded and extended when the image keyword represented by the data is to be on display and can therefore be processed in a significantly short period of time.

It may be further added that, while the dots forming the image keyword data to be transferred to the optical disk are decimated only when the high-density resolution mode is selected, the decimation of the dots forming such data may be effected to reduce the density resolution if the ordinary density or any other density is selected for the display of the image keyword.

Subsequently to the step H04 or step H05, the central processing unit 60 proceeds to step H06 to fetch the final address assigned to the image keyword data which has thus been stored into the optical disk. The step H06 is followed by step H07 at which each of the numerical values indicating the count numbers $N_P$ and $N_D$ for printing and displaying is reset to "0". This step H07 is executed also when it is found at step H01 that the image keyword registration flag "FKWR" is set to logic "1" state and as such the answer for the step H01 is given in the negative.

Having executed the step H07, the central processing unit 60 proceeds to step H08 to calculate the starting address at which the control data associated with the image data which has been stored into the optical disk as has been described with reference to FIG. 14 is to be stored into the hard disk. The step H08 is followed by step H09 at which the control data is now transferred to the hard disk by way of the hard disk interface circuit 66, whereupon the central processing unit 60 puts an end to execution of the keyword/control data write control subroutine program B04 and may revert to the image data storage routine program A03 hereinbefore described with reference to FIG. 5.

The control data stored into the hard disk as at step H09 is formulated in the form of table data and include (1)

image keyword registration flag (FKWR),
image keyword start track,
image keyword end track,
x-axis measurement of image keyword,
y-axis measurement of image keyword, (2)

image area start track,
image area end track,
dot density,
x-axis measurement of image area,
y-axis measurement of image area,
manner of data compression, (3)

image data save flag (FDS),
period of time for saving image data,
count number for printing ($N_P$),
count number for displaying ($N_D$),
date of data reservation,
keyword "1",
keyword "2",
keyword "3",
keyword "4",
keyword "5".

Figure 16A:
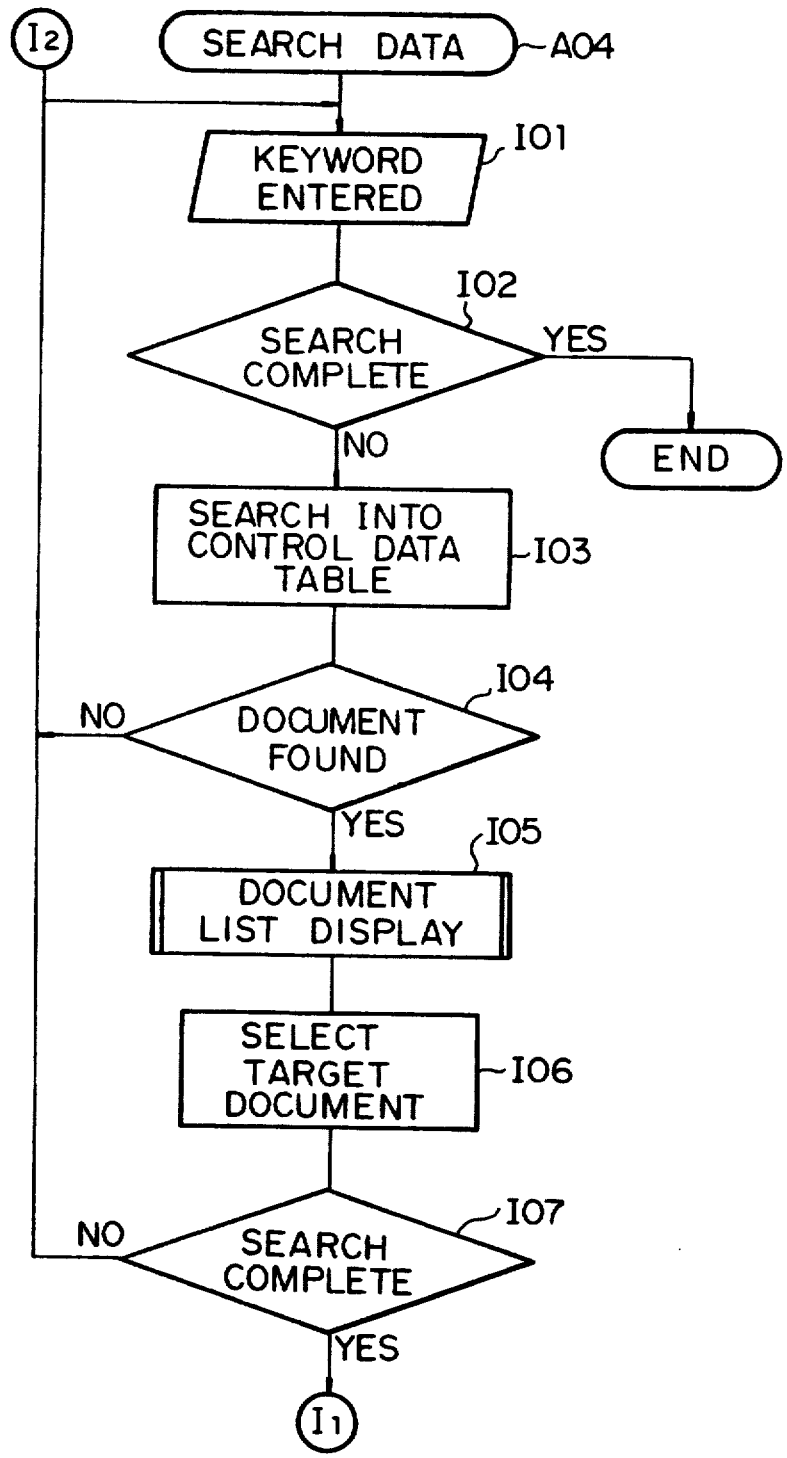
FIGS. 16A and 16B are flowcharts showing the details of a data search subroutine program also included in the main routine program illustrated in FIG. 3.
Figure 16B:
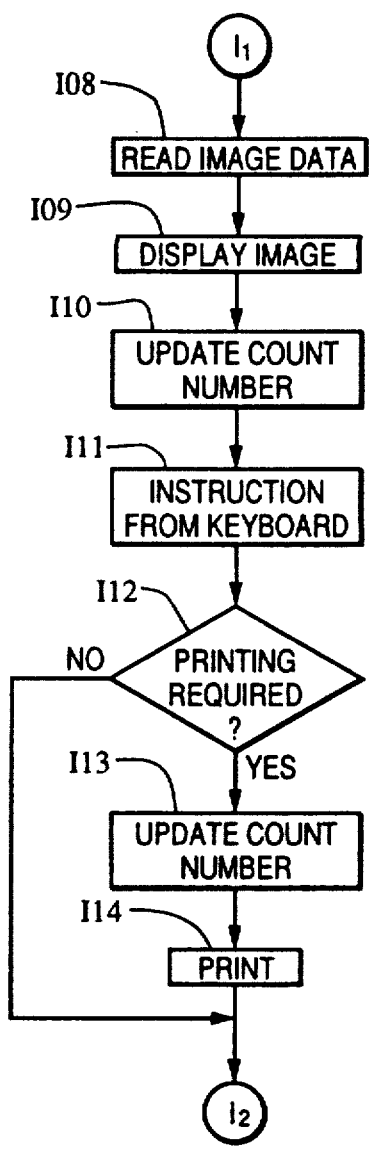
Figure 17A:
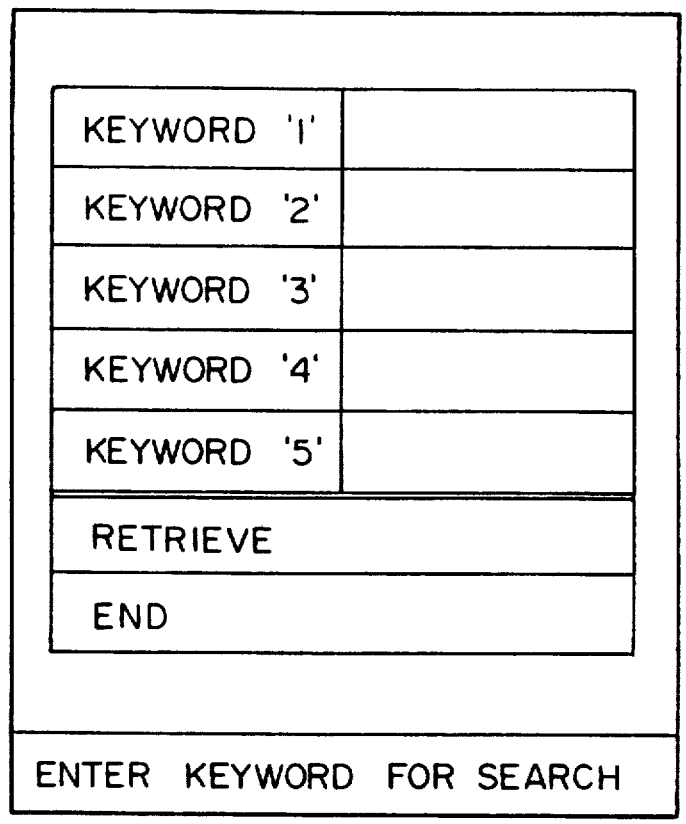
FIG. 17A is a plan view showing a menu of selectable items which are to be displayed on the screen of the display unit of the system at the start of the data search subroutine program illustrated in FIGS. 16A and 16B.
Figure 17B:
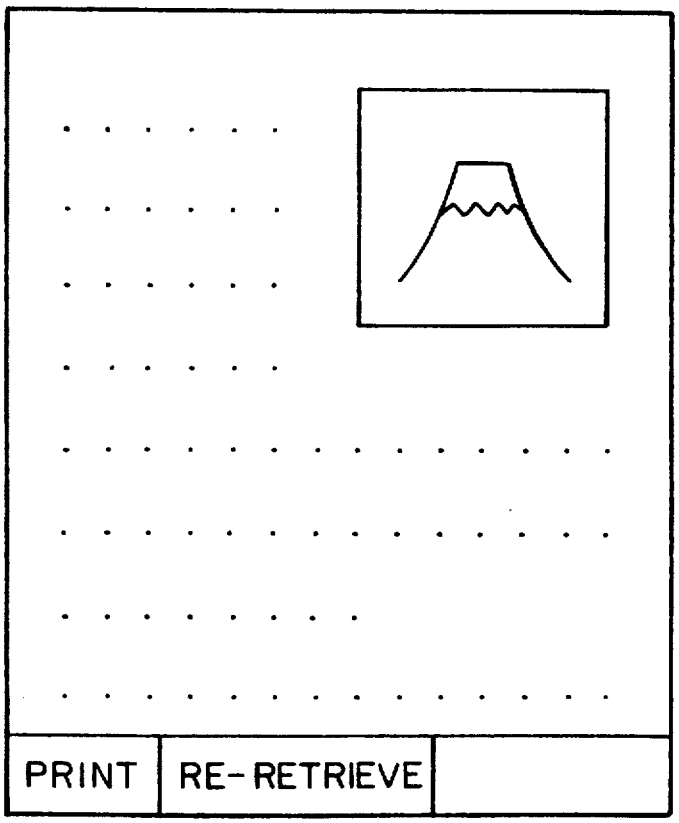
FIG. 17B is a plan view showing a frame of image which may be on display during execution of the data search subroutine program illustrated in FIGS. 16A and 16B.

FIGS. 16A and 16B show the details of the data search subroutine program A04 also included in the main routine program hereinbefore described with reference to FIG. 3. Shown in FIG. 17A is a menu of selectable items which are to be displayed on the screen of the CRT display unit 22 of the system at the start of the data search subroutine program A04. FIG. 17B further shows a frame of image which may be on display during execution of the data search subroutine program A04.

The data search subroutine program A04 starts with step I01 at which the central processing unit 60 is responsive to a main keyword which may be entered through the keyboard 54 by the operator of the system. The central processing unit 60 then proceeds to step I02 to check if there is an operator's instruction entered through the keyboard 54 to put an end to the operation to search for a document. If it is found at this step I02 that there is such an instruction entered through the keyboard 54, the central processing unit 60 terminates execution of the data search subroutine program A04 and may revert to the main routine program hereinbefore described with reference to FIG. 3.

If it is found at step I02 that there currently is no instruction to terminate the search for a document, the central processing unit 60 proceeds to step I03 to search into the control data table stored in the hard disk for the document to which the main keyword entered is assigned. It is then detected at step I04 whether or not the target document is discovered. If it is determined at this step I04 that the target document is not found and accordingly the answer for the step I04 is given in the negative, the central processing unit 60 reverts to step I01 and may repeat the loop of the steps I01 to I04.

When it is thereafter determined that the document represented by the main keyword entered is discovered, then the central processing unit 60 proceeds to a document list display subroutine program I05 to display the list of the main keywords for the documents including the target document on the screen of the CRT display unit 22. The operator of the system will then select the target document from among the documents listed on the screen of the display unit 22 and enter an instruction to select the particular document. The central processing unit 60 is thus responsive to this instruction as at step I06 and thereupon proceeds to step I07 to check if there is an operator's instruction entered through the keyboard 54 to put an end to the document search operation. If it is found at this step I07 that there is no such instruction entered through the keyboard 54, the central processing unit 60 also reverts to step I01 and may repeat the loop of the steps I01 to I04.

When it is found at step I07 that there is an instruction to put an end to the document search operation entered through the keyboard 54, then the central processing unit 60 proceeds to step I08 to read from the optical disk the image data associated with the control data for the document selected at step I06. The image data thus fetched from the optical disk is transmitted through the optical disk interface circuit 68 to the data compression-/extension block 76 and is thereby decoded and extended. The decoded image data is transferred to the image data memory block 74 and the image represented by the data is displayed on the screen of the CRT display unit 22. Shown in FIG. 17B is an example of a frame of image which may thus be displayed on the CRT display unit 22.

After the image of the document under consideration is displayed on the CRT display unit 22 in this manner, the central processing unit 60 proceeds to step I10 to update the count number $N_D$ for displaying to the frame of the image currently on display and the updated count number $N_D$ is stored as part of control data into the hard disk through the hard disk interface circuit 66. If it is desired by the operator of the system to produce a printed version of the image on display, an instruction to such an effect will be entered through the keyboard 54 at step I11. The central processing unit 60 is responsive to this instruction as at step I12 and at step I13 updates the count number $N_P$ for printing to the frame of the image to be printed. Subsequently, the image data stored in the image data memory block 74 is transmitted through the printer interface circuit 80 to the printer 44 of the system and the image represented by the data is printed at step I14.

Figure 18:
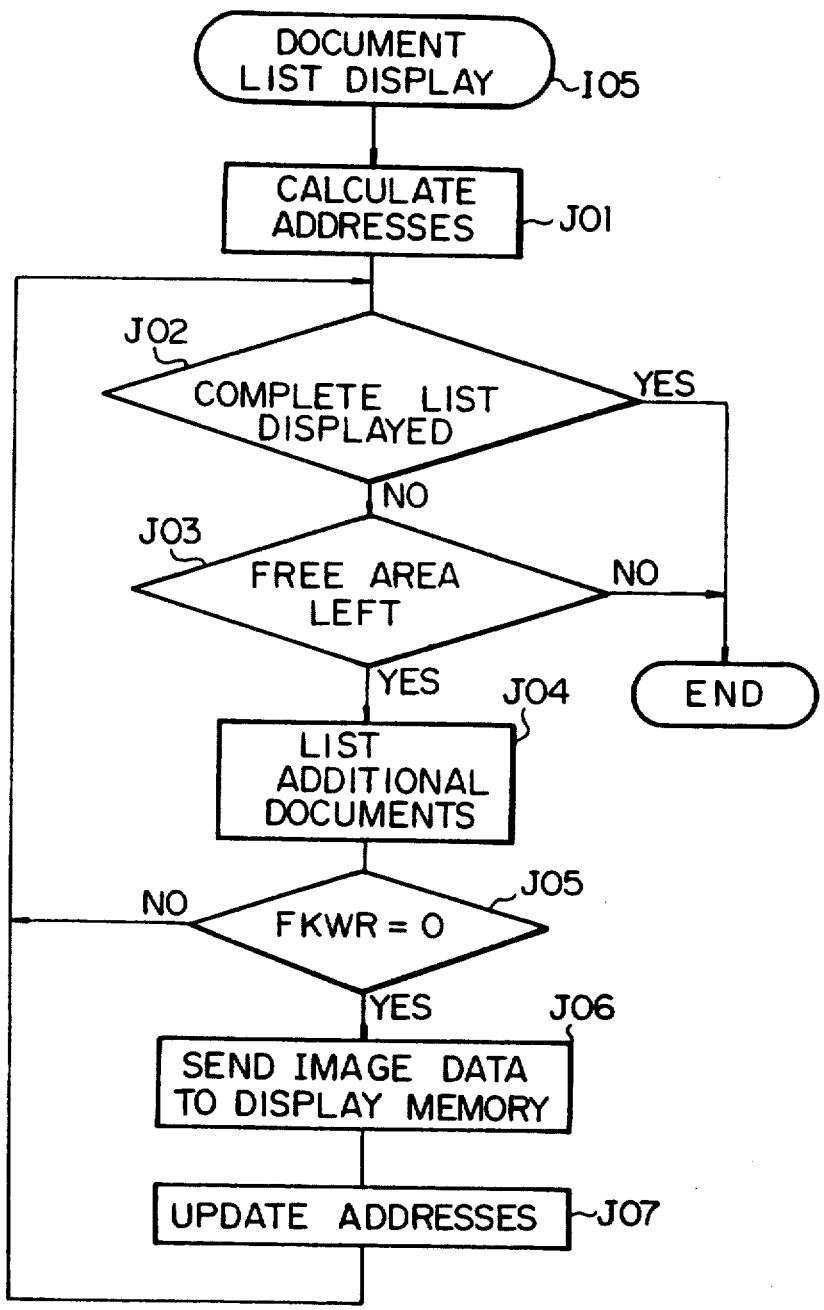
FIG. 18 is a flowchart showing the details of a document list display subroutine program included in the data search subroutine program illustrated in FIGS. 16A and 16B.
Figure 19:
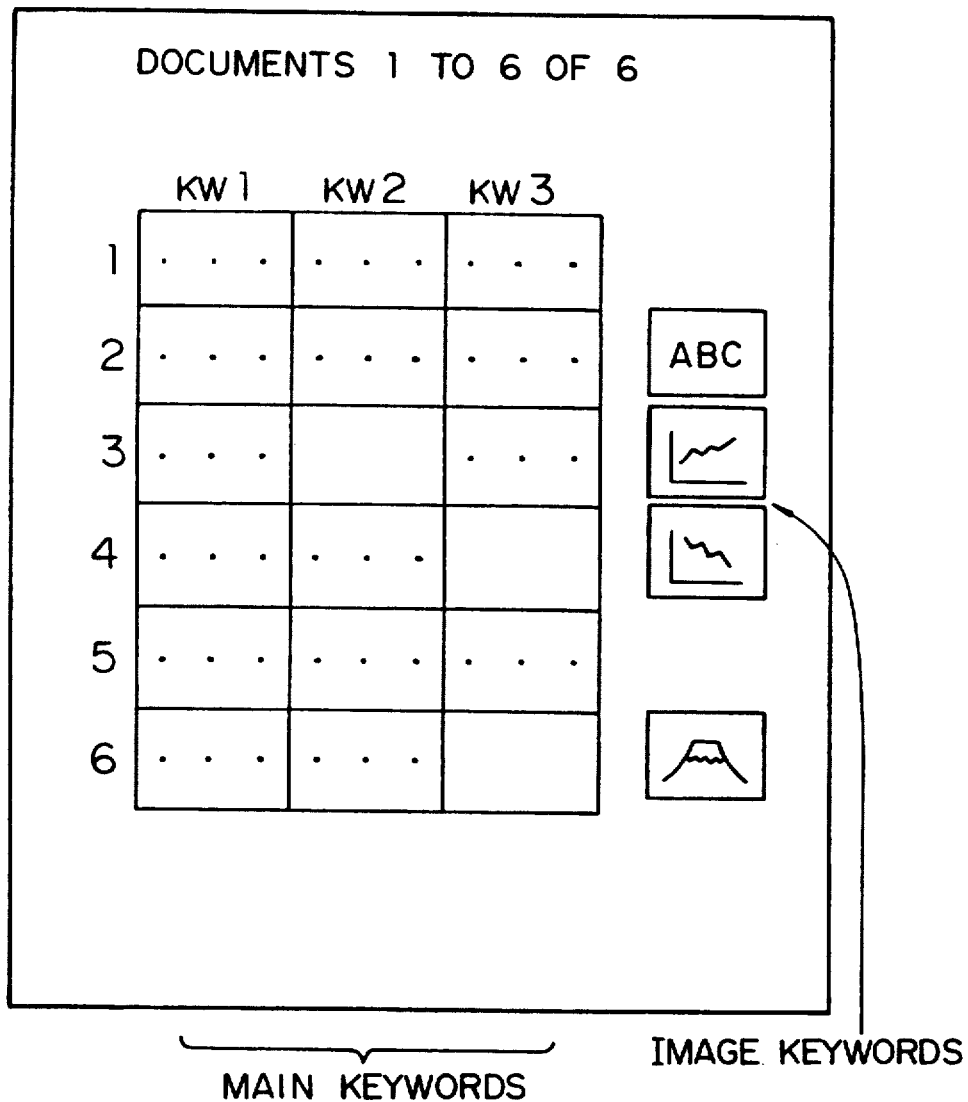
FIG. 19 is plan view showing a frame of image indicating the main keywords and additional or image keywords associated with the documents listed on the display unit of the system during execution of the document list display subroutine program illustrated in FIG. 18.

FIG. 18 shows the details of the document list display subroutine program I05 included in the data search subroutine program A04 hereinbefore described with reference to FIGS. 16A and 16B. Shown in FIG. 19 is a frame of image indicating the main keywords and additional or image keywords associated with the documents listed on the screen of the CRT display unit 22 of the system during execution of the document list display subroutine program I05.

The document list display subroutine program I05 starts with step J01 to calculate addresses at which the list of the keywords for the documents including the target document is to be displayed on the screen of the CRT display unit 22. The central processing unit 60 then proceeds to step J02 to check if the complete list of the main keywords for the documents including the target document has been displayed on the CRT display unit 22. If the answer for the step J02 is given in the affirmative, the central processing unit 60 terminates execution of this document list display subroutine program I05 and may revert to the data search subroutine program A04 described with reference to FIGS. 16A and 16B.

If there remains a document which has been retrieved but which is not yet been listed on the display unit 22, the answer for the step J02 is given in the negative, the step J02 is followed by step J03 at which is detected whether or not there is a free area available on the screen of the CRT display unit 22. If it is determined that there is no free area left on the screen of the display unit 22 and accordingly the answer for the step J03 is given in the negative, the central processing unit 60 also terminates execution of this document list display subroutine program I05 and may revert to the data search subroutine program A04.

If it is found at step J03 that there remains a free area available on the screen of the CRT display unit 22 and accordingly the answer for the step J03 is given in the affirmative, the step J03 is followed by step J04 at which the main keyword or keywords representative of the additional document or documents are listed on the CRT display unit 22. Subsequently to step J04, the central processing unit 60 proceeds to step J05 to detect whether or not the image keyword registration flag "FKWR" is set to logic "1" state. If the answer for this step J05 is given in the negative, the central processing unit 60 reverts to step J02 to repeat the loop of the steps J02 to J05 or terminate execution of this subroutine program I05.

On the other hand, if it is determined at step J05 that the image keyword registration flag "FKWR" is set to logic "1" state and as such the answer for the step J05 is given in the affirmative, the central processing unit 60 proceeds to step J06 to read from the optical disk the image keyword data included in the control data for the target document. The image keyword data thus fetched from the optical disk is transferred by way of the optical disk interface circuit 68 to the display data storage memory of the display memory block 72 and the image keyword represented by the image keyword data is displayed on the screen of the CRT display unit 22. Shown in FIG. 19 is a frame of image indicating the main keywords and additional or image keywords associated with the documents "1" to "6" thus listed on the screen of the CRT display unit 22 of the system at step J06.

In preparation for the display of another set of documents on the CRT display unit 22, the step J06 is followed by step J07 to calculate new addresses at which the list of the keywords for the additional documents is to be displayed on the screen of the CRT display unit 22. The central processing unit 60 then reverts to step J02 to repeat the loop of the steps J02 to J05 or steps J02 to J07 or terminate execution of this subroutine program I05 to revert to the data search subroutine program A04 described with reference to FIGS. 16A and 16B.

Figure 20:
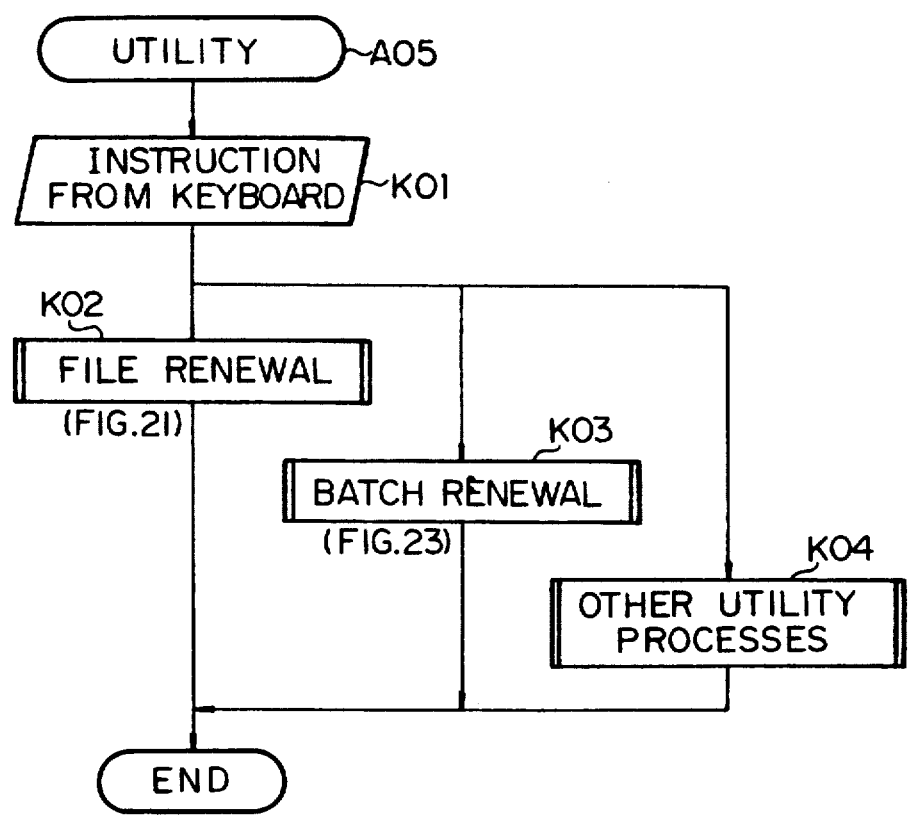
FIG. 20 is a flowchart showing the details of a utility subroutine program further included in the main routine program illustrated in FIG. 3.

FIG. 20 shows the details of the utility subroutine program A05 further included in the main routine program hereinbefore described with reference to FIG. 3.

The utility subroutine program A05 herein shown starts with step K01 at which the central processing unit 60 is responsive to an instruction which may be entered through the keyboard 54 by the operator of the system. The instruction which the central processing unit 60 may thus receive from the keyboard 54 in this instance may be for the execution of a file renewal subroutine program K02, a batch renewal subroutine program K03 or a subroutine program K04 for executing any other utility process. Details of these file renewal subroutine program K02 and batch renewal K03 will be hereinafter described with reference to FIGS. 21A and 21B and FIG. 23, respectively.

Figure 21A:
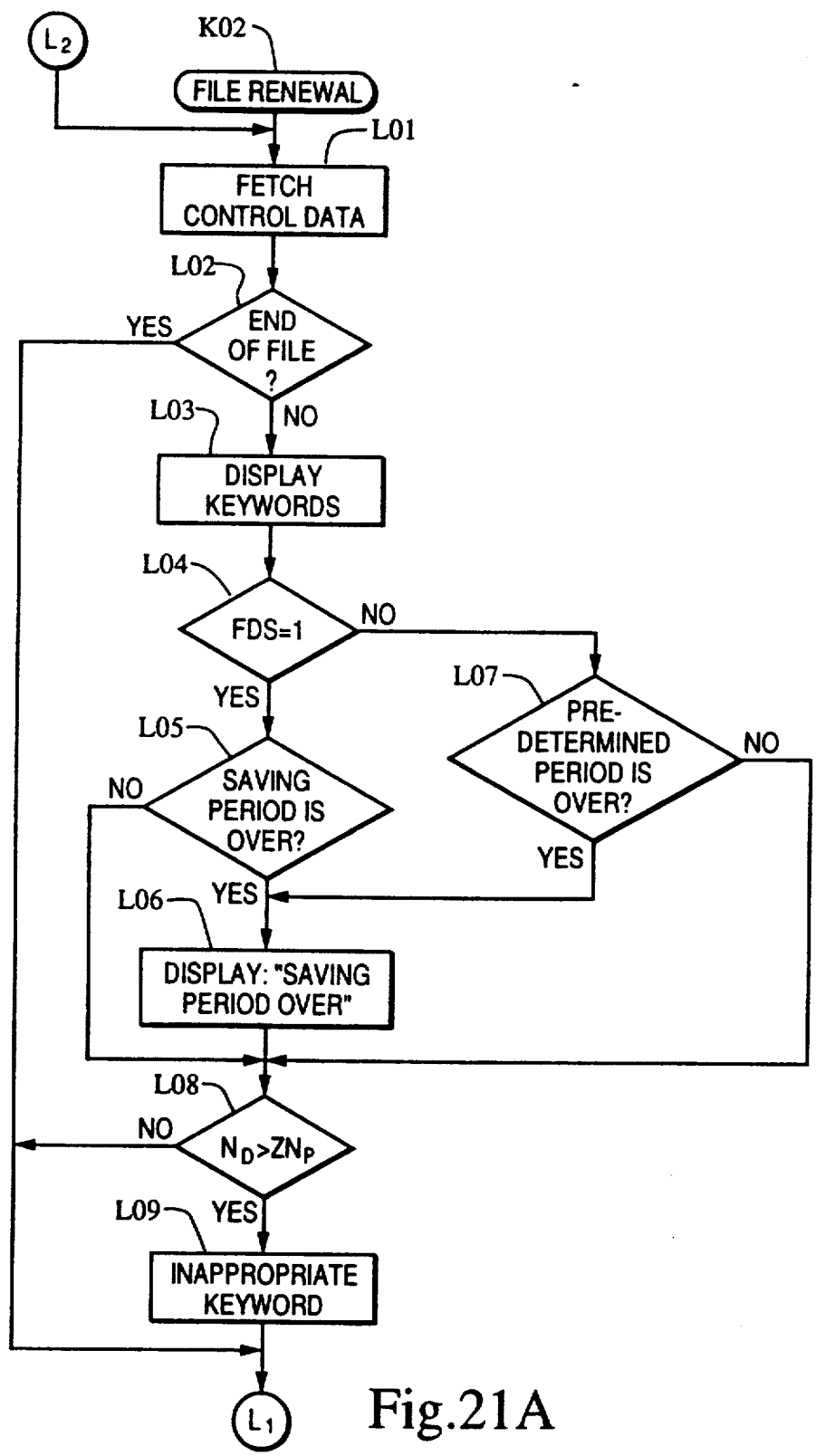
FIGS. 21A and 21B are flowcharts showing the details of a file renewal subroutine program included in the utility subroutine program illustrated in FIG. 20.
Figure 21B:
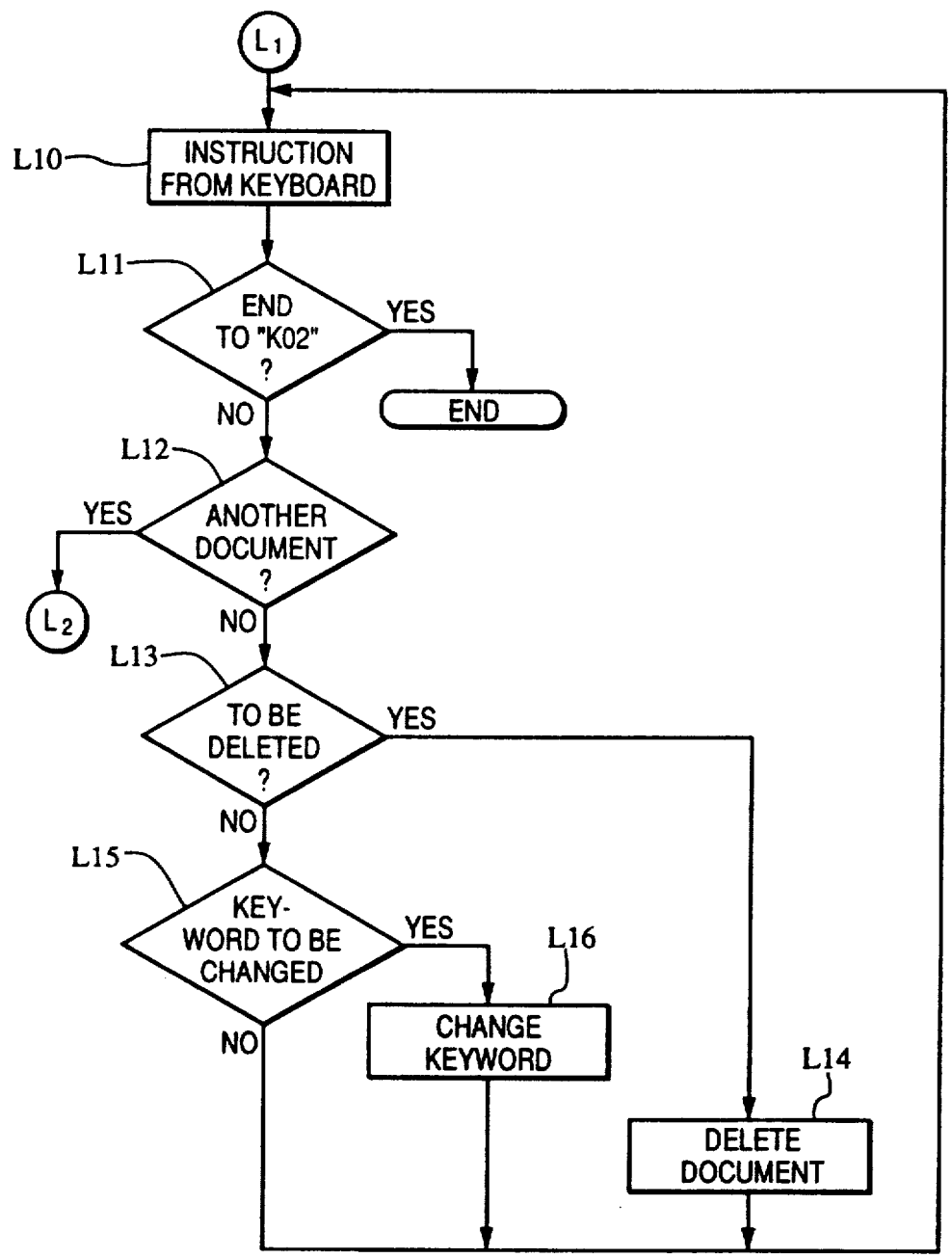

FIGS. 21A and 21B show the details of the file renewal subroutine program K02 included in the utility subroutine program A05 above described with reference to FIG. 20. Illustrated in FIG. 22 is a menu of selectable items which are to be displayed on the CRT display unit 22 of the system at the start of the file renewal subroutine program K02.

The file renewal subroutine program K02 starts with step L01 at which the control data associated with the image data of a document stored in the hard disk is fetched through the hard disk interface circuit 66. The central processing unit 60 then proceeds to step L02 to check if there is no document to be handled by this file renewal subroutine program K02. If the answer for this step L02 is given in the negative, the central processing unit 60 proceeds to step L03 to display the main keyword or keywords of the document having the control data thus fetched from the hard disk. The central processing unit 60 thereafter proceeds to step L04 to detect whether or not the image data save flag "FDS" is set to logic "1" state for the document. If the answer for this step L04 is given in the affirmative in respect of the document, the central processing unit 60 further checks at step L05 if the period of time for which the document currently retrieved was determined to be saved has lapsed or not. If the answer for this step L05 is also given in the affirmative, the central processing unit 60 proceeds to step L06 at which the period of time for which the particular document was determined to be saved and the message showing that such a period of time has already lapsed are indicated on the screen of the CRT display unit 22.

If, on the other hand, it is found at step L04 that the image data save flag "FDS" is not set to logic "1" state for the document and thus the answer for the step L04 is given in the negative, the central processing unit 60 checks at step L07 if a predetermined period of time has lapsed since the particular document was registered. If the answer for this step L07 is given in the affirmative, the step L07 is followed by the step L06 and the period of time for which the document was determined to be saved and the message showing that the period of time has already lapsed are indicated on the CRT display unit 22. If the answer for the step L07 is given in the negative, the step L06 is skipped over and the step L07 is followed by step L08.

The step L08 is executed either subsequently to the step L06 or if the answer for the step L05 or step L07 is given in the negative, wherein it is determined whether or not the currently valid count numbers $N_P$ and $N_D$ for printing and displaying are reasonable ones. Such a decision may be made by examining if the count number $N_D$ for displaying is larger than the count number $N_P$ for printing times two, viz., $$N_D > N_P * 2.$$

When the count number $N_D$ is found to be larger than the count number $N_P$ times two in respect of the document retrieved and currently indicated on the screen of the CRT display unit 22, it is considered that the number of times the document has been printed out is significantly smaller than the number of times the document is called to the display. This in turn will mean that the particular document is quite unlikely to be the target document which the operator desires to reference. Thus, it may be checked at step L08 if the count number $N_D$ for displaying is larger than the count number $N_P$ for printing times two in respect of the document If it is determined at this step L08 that the currently valid count numbers $N_P$ and $N_D$ for printing and displaying are reasonable for the document, the step L08 is followed by step L09 at which the keyword which was used for the retrieval of the target document is deemed inappropriate and a message to such an effect is indicated on the screen of the CRT display unit 22.

Subsequently to step L09 or if it is found at step L08 that the count numbers $N_P$ and $N_D$ for printing and displaying are reasonable for the document, the central processing unit 60 proceeds to step L10 so as to be responsive to any instruction which may be entered through the keyboard 54 by the operator of the system. This step L10 is also executed when it is found at step L02 that there is no document to be handled by this file renewal subroutine program K02.

It is thus checked at step L11 if there is an instruction to put an end to the file renewal subroutine program K02. If the answer for this step L11 is given in the affirmative, the central processing unit 60 terminates execution of this file renewal subroutine program K02 and may revert to the utility subroutine program A05 hereinbefore described with reference to FIG. 20. If it is found at step L11 that there is no instruction to put and end to the subroutine program K02, the central processing unit 60 proceeds to step L12 to detect whether or not there is an instruction requiring the renewal of another document. If the answer for this step L12 is given in the affirmative, the central processing unit 60 return to step L01 and may repeat the loop of the steps L01 to L12 until the answer for the step L11 turns affirmative or the answer for the step L12 turns negative.

When it is found at step L12 that there is no additional document to be renewed and accordingly the answer for the step L12 is given in the negative, the central processing unit 60 proceeds to step L13 to check if there is an instruction requiring deletion of the document retrieved. If the answer for this step L13 is given in the affirmative, the central processing unit 60 proceeds to step L14 to perform a procedure to delete the control data for the particular document from the hard disk. It may be noted that the optical disk used in the system under consideration is assumed to be of the read-only memory type and, accordingly, the image data for the document having the control data thus deleted from the hard disk is maintained in the optical disk but is not accessible with no control data available in association with the image data.

On the other hand, if there is no instruction requiring deletion of the document under consideration, it is checked at step L15 whether or not there is an instruction requiring a change of the keyword for the document retrieved. If the answer for this step L15 is given in the affirmative, the central processing unit 60 proceeds to step L16 to perform a procedure to change the keyword for the document If it is found at step L15 that there is no instruction requiring a change of the keyword for the document and thus the answer for the step L15 is given in the negative, the central processing unit 60 reverts to step L10 and may repeat the loop of the steps subsequent to the step L10 until the answer for the step L11 turns affirmative.

Figure 23:
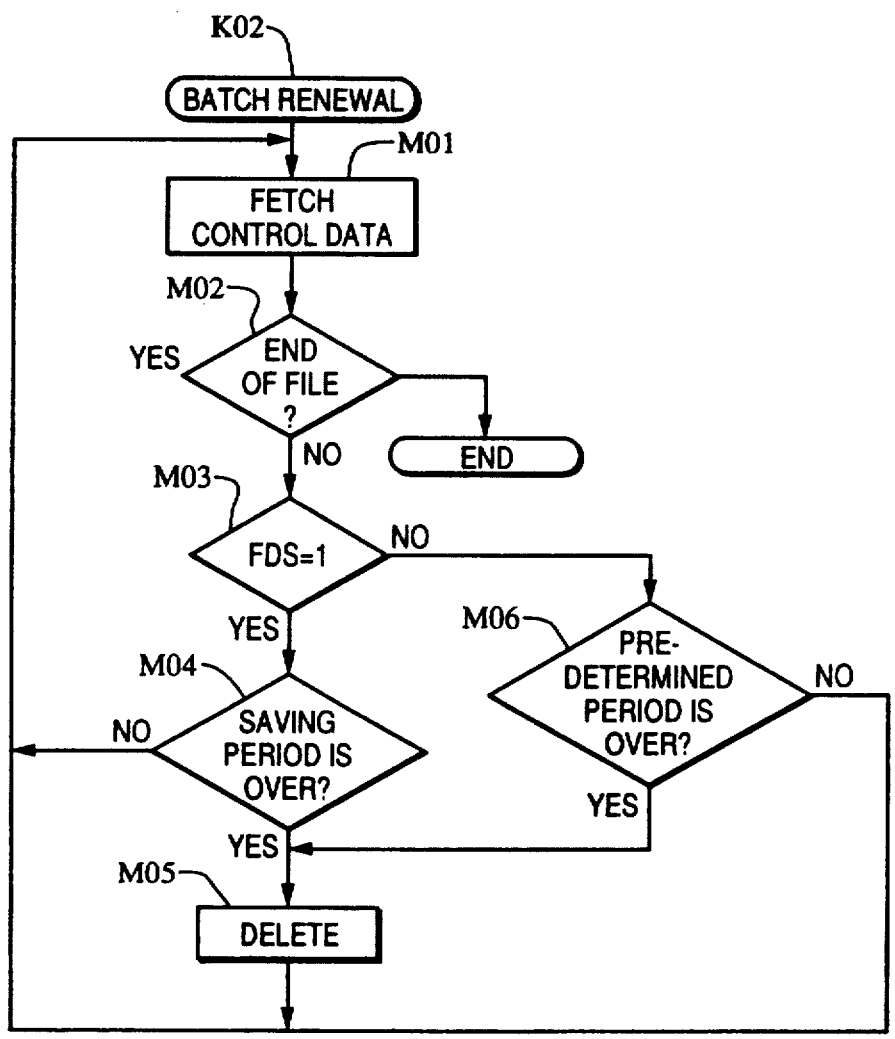
FIG. 23 is a flowchart showing the details of a batch renewal subroutine program also included in the utility subroutine program illustrated in FIG. 20.

FIG. 23 shows the details of the batch renewal subroutine program K03 also included in the utility subroutine program A05 hereinbefore described with reference to FIG. 20.

The batch renewal subroutine program K03 starts with step M01 at which the control data associated with the image data of a document stored in the hard disk are fetched through the hard disk interface circuit 66. The central processing unit 60 then proceeds to step M02 to check if there is no document to be handled by this batch renewal subroutine program K03. If the answer for this step M02 is given in the affirmative, the central processing unit 60 terminates execution of this batch renewal subroutine program K03 and may revert to the utility subroutine program A05 hereinbefore described with reference to FIG. 20. If it is found at step M02 that there is no document to be handled by this batch renewal subroutine program K03, the central processing unit 60 proceeds to step M03 to detect whether or not the image data save flag "FDS" is set to logic "1" state for the document. If the answer for this this step M03 is given in the affirmative in respect of the document, the central processing unit 60 further checks at step M04 if the period of time for which the document currently retrieved was determined to be saved has lapsed or not. If the answer for this step M04 is also given in the affirmative, the central processing unit 60 proceeds to step M05 to perform a procedure to delete the control data for the particular document from the hard disk.

On the other hand, if it is found at step M03 that the image data save flag "FDS" is not set to logic "1" state for the document and thus the answer for the step M03 is given in the negative, the central processing unit 60 checks at step M06 if a predetermined period of time has lapsed since the particular document was registered. If the answer for this step M06 is given in the affirmative, the step M06 is followed by the step M05 perform the procedure to delete the control data for the particular document from the hard disk. If the answer for the step M06 is given in the negative, the step M06 is skipped over and the central processing unit 60 may revert to step M01 and may repeat the loop of the steps M01 to M06 until the answer for the step M02 turns affirmative.

As will have been understood from the foregoing description, the period of time for which a given document is to be saved is determined on the basis of an instruction entered by the operator of the system through execution of the subroutine program of FIG. 10 provided the operator level as previously defined is acceptable. If such a period of time is not determined by the operator or could not be determined due to the unacceptable operator level, the period of time for which the document is to be saved is automatically predetermined by means of the image filing system per se. Whether a document has been saved for a period of time longer than the period of time thus determined either by the operator or the system per se is detected during execution of the file renewal or batch renewal subroutine program hereinbefore described with reference to FIG. 21 or 23. If it is detected that the document has been saved for a period of time longer than the predetermined period of time, there is generated and displayed a message indicating the fact. It may be incidentally noted that the period of time for which a document is to be saved by an image filing system according to the present invention per se may be as long as, for example, three years or so.

While the deletion of a document is effected with the control data for the document deleted from the hard disk, any appropriate means may be provided to determine whether a document should be deleted or to automatically delete a document on confirmation that the document has been saved for a predetermined period of time.

It may be further noted that, while the image keyword data is stored into the optical disk without being coded and compressed before the data is loaded into the disk, image keyword data used in a system according to the present invention may be coded and compressed by means of the data compression/extension block 76 before the data is loaded into the optical disk.

What is claimed is:

1. In an image filing system for reading an image on a document, for preserving data relating to an image read from the document and for reading out preserved data for use thereafter, a method of managing documents filed in the system, comprising the steps of
   a) reading an image on a document, generating image data representative of an image read from the document, and storing the image data in first memory means,
   b) storing in second memory means control data associated with said image data,
   c) generating additional managerial information regarding the image data to be stored in said first memory means,
   d) inspecting the additional managerial information to determine if the additional managerial information is appropriate,
   e) when the additional managerial information inspected is determined to be inappropriate, generating a message indicating that the additional managerial information inspected is determined to be inappropriate, said message being to prompt an operator of the system to enter any instruction responsive to the message, and
   f) executing a procedure responsive to said instruction, in which
   the step of generating additional managerial information comprises
      c-1) counting a number of times which the document has been searched for,
      c-2) counting a number of time which the document has been used for printing purposes, and
      c-3) generating data relating to the number of times which the document has been searched for and the number of times which the document has been used for printing purposes as said additional managerial information, and in which
   the step of inspecting the additional managerial information to determine if the additional managerial information is appropriate comprises
      d-1) determining whether or not the number of times which said document has been searched for and the number of times which said document has been used for printing purposes satisfy a predetermined relationship therebetween, the predetermined relationship being predetermined to be probative of said additional managerial information being inappropriate.

2. A method as set forth in claim 1, in which the step of executing a procedure responsive to said instruction comprises
- f-1) deleting from said second memory means the control data associated with said image data for a document having the additional managerial information determined to be inappropriate.

3. A method as set forth in claim 1 in which said predetermined relationship is such that the number of times which a given document has been searched for is larger than two times the number of times which the document has been used for printing purposes.

4. A method as set forth in claim 1, in which
said the step of generating additional managerial information further comprises
- c-4) registering a period of time for which a document is to be saved by said system as said additional managerial information, and in which
- the step of inspecting the additional managerial information to determine if the additional managerial information is appropriate further comprises
- d-2) determining whether or not a document has been saved for a registered period of time longer than the period of time.

5. A method as set forth in claim 4, in which the period of time for which a document is to be saved is registered according to an instruction entered by the operator of the system.

6. A method as set forth in claim 5, in which the period of time for which a document is to be saved is automatically registered in the absence of an instruction entered by the operator of the system.

7. In an image filing system for reading an image on a document, for preserving data relating to an image read from the document and for reading out preserved data for use thereafter, a method of managing documents filed in the system, comprising the steps of
- a) reading an image on a document, generating image data representative of an image read from the document, and storing the image data in first memory means,
- b) storing in second memory means control data associated with said image data,
- c) incrementing a count number of a first counter each time the document is searched for,
- d) incrementing a count number of a second counter each time the document is put to use,
- e) detecting if the count number of the first counter and the count number of the second counter satisfy a predetermined relationship therebetween,
- f) when it is detected that the predetermined relationship is satisfied, generating a message that said predetermined relationship is satisfied, said message being to prompt an operator of the system to enter any instruction responsive to the message, and
- g) executing a procedure responsive to said instruction.

8. A method as set forth in claim 7, in which said predetermined relationship is such that the count number of the first counter is larger than the count number of the second counter.

9. A method as set forth in claim 7, in which the step of executing a procedure responsive to said instruction comprises
- f-1) deleting from said second memory means the control data associated with said image data for a document in respect of which said predetermined relationship is detected to be satisfied.

10. In an image filing system for reading an image of a document, for preserving data relating to an image read from the document and for reading out preserved data for use thereafter, a method of managing documents filed in the system, comprising the steps of
- a) reading an image on a document, generating image data representative of an image read from the document, and storing the image data in first memory means,
- b) storing in second memory means control data associated with said image data,
- c) registering a period of time for which the document is to be saved under control of the system,
- d) determining whether or not the document has been saved for a period of time longer than the registered period of time,
- e) when the document is determined to have been saved for a period of time longer than the period of time for which the document is registered to be saved, generating visible information indicating that effect, and
- f) executing a procedure responsive to said visible information.

11. A method as set forth in claim 10, in which the period of time for which a document is to be saved is registered according to an instruction entered by an operator of the system.

12. A method as set forth in claim 10, in which the period of time for which a document is to be saved is automatically registered.

13. A method as set forth in claim 10, in which the period of time for which a document is to be saved is registered according to an instruction entered by an operator of the system and is registered automatically when an instruction is not entered by an operator of the system.

14. A method as set forth in claim 10, in which the step of executing a procedure responsive to said visible information comprises
- f-1) deleting from said second memory means the control data associated with said image data for the document in respect of which said visible information is generated.

15. A method as set forth in claim 10, in which said visible information is the period of time for which the document has been saved since the time at which the document had been stored.

16. In an image filing system for reading an image of a document, for preserving data relating to an image read from the document and for reading out preserved data for use thereafter, a method of managing documents filed in the system comprising the steps of:
- a) reading an image on a document, generating image data representative of the image data from the document, and storing the image data in first memory means;
- b) storing in second memory means control data associated with said image data, said control data including at least a time at which the document has been stored;

c) registering a period of time for which the document is to be saved under the control of the system;
d) determining whether or not the document has been saved for a period of time longer than the registered period of time; and
e) when the document is determined to have been saved for a period of time longer than the period of time for which the document is registered to be saved, displaying the period of time for which the document has been saved since the time at which the document had been stored.

* * * * *